(12) United States Patent
Uehara et al.

(10) Patent No.: US 7,799,396 B2
(45) Date of Patent: *Sep. 21, 2010

(54) GAS BARRIER LAYERED PRODUCT, METHOD OF MANUFACTURING THE SAME AND PACKAGING MEDIUM USING THE SAME

(75) Inventors: Goki Uehara, Kurashiki (JP); Manabu Shibata, Kurashiki (JP); Tatsuya Oshita, Kurashiki (JP)

(73) Assignee: Kuraray Co., Ltd., Kurashiki-shi (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/916,371

(22) PCT Filed: May 29, 2006

(86) PCT No.: PCT/JP2006/310696

§ 371 (c)(1),
(2), (4) Date: Dec. 3, 2007

(87) PCT Pub. No.: WO2006/129619

PCT Pub. Date: Dec. 7, 2006

(65) Prior Publication Data

US 2009/0030126 A1    Jan. 29, 2009

(30) Foreign Application Priority Data

Jun. 3, 2005   (JP) ............................ 2005-164108

(51) Int. Cl.
- B32B 27/10 (2006.01)
- B32B 27/08 (2006.01)
- B32B 9/04 (2006.01)
- B32B 29/00 (2006.01)
- B05D 3/10 (2006.01)
- B05D 3/02 (2006.01)

(52) U.S. Cl. .............. 428/35.2; 428/35.7; 428/446; 428/537.5; 427/337; 427/391

(58) Field of Classification Search .......... 428/34.1, 428/34.2, 35.7, 411.1, 35.2; 427/331, 372.2, 427/337, 446, 537.5, 391

See application file for complete search history.

(56) References Cited

U.S. PATENT DOCUMENTS

2002/0048680 A1*  4/2002  Yamanaka ............... 428/447
2007/0111005 A1    5/2007  Oshita et al.

FOREIGN PATENT DOCUMENTS

| | | |
|---|---|---|
| EP | 0 240 571 A1 | 10/1987 |
| JP | 57-030745 | 6/1982 |
| JP | 62-094834 | 6/1987 |
| JP | 62-158677 | 7/1987 |
| JP | 7-118543 | 5/1995 |
| JP | 7-308994 | 11/1995 |
| JP | 8-099390 | 4/1996 |
| JP | 9-239911 | 9/1997 |
| JP | 9-262943 | 10/1997 |
| JP | 10-122477 | 5/1998 |
| JP | 10-194273 | 7/1998 |
| JP | 10-244613 | 9/1998 |
| JP | 10237180 | 9/1998 |
| JP | 11-129380 | 5/1999 |
| JP | 11-508502 | 7/1999 |
| JP | 11-227752 | 8/1999 |
| JP | 11-256094 | 9/1999 |
| JP | 11-257574 | 9/1999 |
| JP | 2000-233478 | 8/2000 |
| JP | 2001-328681 | 11/2001 |
| JP | 2002-138109 | 5/2002 |
| JP | 2002-294153 | 10/2002 |
| JP | 2002-326303 | 11/2002 |
| JP | 2002 326303 | 11/2002 |
| JP | 2003-54537 | 2/2003 |
| JP | 2003-112719 | 4/2003 |
| JP | 2003-191364 | 7/2003 |
| JP | 2003 292713 | 10/2003 |
| JP | 2003-292713 | 10/2003 |
| JP | 2004-314563 | 11/2004 |
| JP | 2005-8160 | 1/2005 |
| JP | 2005-40489 | 2/2005 |
| WO | WO 97/02140 | 1/1997 |
| WO | 03 091317 | 11/2003 |

OTHER PUBLICATIONS

Machine Translation of JP 2003-292713 Oct. 15, 2003.*

(Continued)

Primary Examiner—Rena L Dye
Assistant Examiner—Erik Kashnikow
(74) Attorney, Agent, or Firm—Oblon, Spivak, McClelland, Maier & Neustadt, L.L.P.

(57) ABSTRACT

A gas barrier layered product including a base material and a layer stacked on a surface of the base material, wherein the layer is formed of a composition including: a hydrolyzed and condensed product of a compound (L) containing a metal atom to which a group selected from a halogen atom and an alkoxy group is bonded, and a compound (A) in which an organic group selected from a halogen atom, a mercapto group and a hydroxyl group is further bonded to the metal atom; a neutralized product of a polymer containing a functional group selected from a carboxyl group and a carboxylic anhydride group, wherein at least 40 mol % of a —COO— group contained in the functional group has been neutralized with a metal ion having a valence of two or more; and a compound (D) bonded to both the —COO— group and a group on the surface of the hydrolyzed and condensed product of the compound (L). A method for producing the gas barrier layered product.

20 Claims, No Drawings

OTHER PUBLICATIONS 2003-292713 Publication date Oct. 15, 2003, partial English Translation.

U.S. Appl. No. 11/909,562, filed Sep. 24, 2007, Oshita, et al.

* cited by examiner

US 7,799,396 B2

GAS BARRIER LAYERED PRODUCT, METHOD OF MANUFACTURING THE SAME AND PACKAGING MEDIUM USING THE SAME

CROSS-REFERENCE TO RELATED APPLICATIONS

The present application is a 35 U.S.C. §371 National Stage patent application of International patent application PCT/JP2006/310696, filed on May 29, 2006, which claims priority to Japanese patent application JP 2005-164108, filed on Jun. 3, 2005.

TECHNICAL FIELD

The present invention relates to a gas barrier layered product, a method of manufacturing the same and a packaging medium using the layered product.

BACKGROUND ART

Materials for packaging foods and various articles often are required to have a gas barrier property, particularly, an oxygen barrier property. Such properties protect packaged contents from influence such as oxidation deterioration due to oxygen. Packaging foods, in particular, has a problem of proliferating microorganisms due to the presence of oxygen and thus decaying the contents. For this reason, conventional packaging materials are provided with gas barrier layers to prevent gas, such as oxygen, from permeating through them.

Examples of such gas barrier layer include metal foil or a vapor deposition layer of metal or a metal compound. Generally used gas barrier layers include aluminum foil, an aluminum vapor deposition layer, a silicon oxide vapor deposition layer and an aluminum oxide vapor deposition layer. Metal layers such as aluminum foil and an aluminum vapor deposition layer, however, have disadvantages of not showing the packaged contents and having low disposability, for example. Metal compound layers such as a silicon oxide vapor deposition layer and an aluminum oxide vapor deposition layer have disadvantages of loosing the gas barrier property considerably by deformation or drop of the packaging material or impact to the packaging material while transported.

The gas barrier layer also may employ a layer formed of a vinylalcohol based polymer with excellent gas barrier property such as polyvinyl alcohol and an ethylene-vinyl alcohol copolymer. Such a layer formed of a vinylalcohol based polymer has advantages of being transparent and having less problems on disposability; it is applied to a wider range of uses.

The vinylalcohol based polymer exhibits the gas barrier property by crystallizing through hydrogen bonds between hydroxyl groups in the molecules. Accordingly, conventional vinylalcohol based polymers show a high gas barrier property when they are dried, whereas they tend to have loosened hydrogen bonds and show a lowered gas barrier property when they have absorbed moisture due to water vapor, for instance. Thus, vinylalcohol based polymers such as polyvinyl alcohol do not easily exhibit a high level of gas barrier property under a highly humid condition.

In addition, studies have been made on materials containing a polymer compound and a hydrolyzed and condensed product of metal alkoxide (for instance, tetramethoxysilane) as materials with a gas barrier property. Such materials are disclosed in, for example, JP2002-326303 A, JP7 (1995)-118543 A, and JP2000-233478 A.

DISCLOSURE OF INVENTION

In recent years, retort packed foods are produced more, which are made by filling contents in a food packaging material and then immersing them in hot water for sterilization. Under these circumstances, packaging materials for retort packed foods are required to furnish higher standards in quality, such as high resistance to breakage in the package when a food packaging material is dropped with the contents filled in, an oxygen barrier property after sterilized in hot water, and an oxygen barrier property under high humidity condition until delivered to a consumer. Particularly, packaging materials are demanded that exhibit a high oxygen barrier property independent of humidity, exhibit a high oxygen barrier property even after subjected to retort pouch processing and have excellent strength and transparency although the conventional techniques cannot satisfy such demands sufficiently. For example, a conventional packaging material did not always have sufficient physical properties such as a gas barrier property when fabricated with emphasis on maximizing the transparency.

With such a situation in mind, one of the objects of the present invention is to provide a gas barrier layered product exhibiting a high oxygen barrier property independent of humidity and having excellent transparency. In particular, another of the objects of the present invention is to provide a gas barrier layered product having high transparency, going through processes after fabrication easily and having excellent mechanical properties even after retort pouch processing. Still another of the objects of the present invention is to provide an advantageous method of manufacturing such a gas barrier layered product industrially.

The present inventors made thorough studies to achieve the objects. The present inventors thus found that a layer formed of the composition described below is improved dramatically in its characteristics by immersing a layered product in a solution containing a metal ion with a valence of two or more, where the layered product including the layer, as a gas barrier layer, formed of the composition containing a hydrolyzed and condensed product of metal alkoxide and a polymer containing at least one functional group selected from carboxyl group and a carboxylic anhydride group, for neutralizing the functional group in the polymer. The present inventors also found that using a hydrolyzed and condensed product of a metal compound having a specific functional group improves transparency of the composition. They also found that adding a compound bonding the hydrolyzed and condensed product and the polymer together enables to obtain a composition forming a layered product with better characteristics. The present invention is based on these novel findings.

That is, a gas barrier layered product of the present invention includes a base material and a layer stacked on at least one surface of the base material. The layer is formed of a composition includes: a hydrolyzed and condensed product of at least one compound (L) containing a metal atom to which at least one group selected from a halogen atom and an alkoxy group is bonded; a neutralized product of a polymer containing at least one functional group selected from carboxyl group and a carboxylic anhydride group; and a compound (D). At least a part of a —COO— group contained in the at least one functional group is neutralized by a metal ion having a valence of two or more. The compound (L) includes at least one compound (A) in which an organic group having at least one characteristic group, selected from a halogen atom, mercapto group and hydroxyl group, further bonded to the metal atom. The compound (D) is a compound bonding to both the —COO— group contained in the at least one functional group and a group on the surface of the hydrolyzed and condensed product. In this description, "to bond to" includes the cases of chemical reaction and formation of a hydrogen bond or a coordination bond.

A packaging medium of the present invention includes the gas barrier layered product according to the present invention.

A method of manufacturing a gas barrier layered product of the present invention includes (i) preparing a mixed solution of a compound (D), a hydrolyzed and condensed product of at least one compound (L) containing a metal atom to which at least one group selected from a halogen atom and an alkoxy group is bonded, and a polymer containing at least one functional group selected from carboxyl group and a carboxylic anhydride group, (ii) forming a layer on the base material by applying the mixed solution on the base material and drying, and (iii) bringing the layer into contact with a solution containing a metal ion with a valence of two or more. The compound (L) includes at least one compound (A) in which an organic group having at least one characteristic group, selected from a halogen atom, mercapto group and hydroxyl group, further bonded to the metal atom. The compound (D) is a compound bonding both to the —COO— group contained in the at least one functional group and a group on the surface of the hydrolyzed and condensed product.

The present invention enables to obtain a gas barrier layered product exhibiting a high oxygen barrier property independent of humidity and having excellent transparency. The present invention also enables to obtain a gas barrier layered product exhibiting a high oxygen barrier property even after subjected to retort pouch processing and having high strength and excellent transparency. The gas barrier layered product is manufactured industrially easily by the manufacturing method of the present invention.

The gas barrier layered product is used effectively as packaging materials for foods, medicines, medical equipments, machine parts, and garments, for example. Among all, it is used particularly effectively for food packaging that requires a gas barrier property in a highly humid condition. Specifically, it can serve as a layered product for a lid or a top of a container having contents such as cooked rice, instant Ramen noodles, yoghurt, fruit jelly, custard pudding and soybean paste, a pouch with a spout having contents such as space food and military field rations, a standing pouch, a vacuum insulation panel, a vacuum packed bag, a paper container, a windowed paper container, a laminated tube container, a medical infusion bag and electronic component packaging, and it prevents the contents from deterioration over a long period of time.

BEST MODE FOR CARRYING OUT THE INVENTION

Embodiments of the present invention are described below. Although specific compounds may be indicated as examples of substances exhibiting a specific function in the following descriptions, the present invention is not limited to them. Materials indicated as examples may be used individually or in combination unless otherwise specified.

(Gas Barrier Layered Product)

The gas barrier layered product of the present invention is a gas barrier layered product (a multi-layered product) including a base material and a layer (hereinafter, also may be referred to as a "gas barrier layer") stacked on at least one surface of the base material. The gas barrier layer is formed of a composition includes: a hydrolyzed and condensed product of at least one compound (L) containing a metal atom to which at least one group selected from a halogen atom and an alkoxy group is bonded; a neutralized product of a polymer containing at least one functional group selected from carboxyl group and a carboxylic anhydride group; and a compound (D). At least a part of a —COO— group contained in the at least one functional group is neutralized by a metal ion having a valence of two or more. The compound (L) includes at least one compound (A) in which an organic group having at least one characteristic group, selected from a halogen atom, mercapto group and hydroxyl group, further bonded to the metal atom. The compound (D) is a compound bonding to both the —COO— group contained in the at least one functional group and a group on the surface of the hydrolyzed and condensed product. The composition may include a single type or a plurality of types of the compound (D).

In the composition, the compound (D) may be bonded to both of the hydrolyzed and condensed product of the compound (L) and the polymer for linking them. From another perspective, the gas barrier layer of the layered product of the present invention is an inorganic-organic composite layer obtained by bonding the compound (D) to both the hydrolyzed and condensed product of the compound (L) and the polymer for coupling them via the compound (D).

The metal atom of the compound (L) is selected from silicon (Si), aluminum (Al), titanium (Ti), zirconium (Zr), copper (Cu), calcium (Ca), strontium (Sr), barium (Ba), zinc (Zn), boron (B), gallium (Ga), yttrium (Y), germanium (Ge), lead (Pb), phosphorus (P), antimony (Sb), vanadium (V), tantalum (Ta), tungsten (W), lanthanum (La) and neodymium (Nd), and it is preferably Si or Al.

The metal atom of the compound (A) may employ, for example, silicon, tin or titanium, and silicon is employed preferably. Although silicon atom may be classified into nonmetal atom, they are considered to be metal atom in this specification. Among them, silicon atom is preferred because the reaction is easily controlled, a stable product is obtained and they are easily available. When the metal atom of the compound (A) is a silicon atom, the silicon atom is bonded to an organic group having at least one characteristic group selected from a halogen atom, mercapto group and hydroxyl group and to at least one group selected from a halogen atom and an alkoxy group. As long as the effect of the present invention is obtained, the silicon atom may be bond to one or more of other substituent groups. Examples of such other substituent groups may be, for example, a hydrogen atom, an alkyl group, an alkenyl group, an aryl group, an aralkyl group and an amino group.

Examples of the compound (A) including the silicon atom may be, for example, the compound expressed by the formula (I) below, allyl(chloropropyl)dichlorosilane, bis(chloromethyldimethylsiloxy)benzene, N-(3-triethoxysilylpropyl)gluconamide, and N-(3-triethoxysilylpropyl)-4-hydroxybutyramide.

The compound (A) may be applied at least one compound expressed by the chemical formula (I) below.

$$\text{Si}(OR^1)_m R^2_n X^1_k Z_{4-m-n-k} \qquad (I)$$

[In the chemical formula (I), each of $R^1$ and $R^2$ denotes an alkyl group independently. $X^1$ denotes a halogen atom. Z denotes an organic group having at least one characteristic group selected from a halogen atom, mercapto group and hydroxyl group. m denotes an integer from 0 to 3. n denotes an integer from 0 to 2. k denotes an integer from 0 to 3. 1≦m+k≦3. 1≦m+n+k≦3.]

Each of $R^1$ and $R^2$ is independently an alkyl group such as methyl group, ethyl group, n-propyl group, iso-propyl group, n-butyl group or t-butyl group, and is preferably methyl group or ethyl group. Examples of the halogen indicated by $X^1$ include, for example, chlorine, bromine and iodine, and the halogen is preferably chlorine.

The organic group Z may be a hydrocarbon group (with an approximate carbon number from one to five, for example) substituted by at least one characteristic group selected from a halogen atom, mercapto group and hydroxyl group. Examples of such organic group include chloromethyl group, chloroethyl group, chloropropyl group, chloroethylmethyl group or organic groups obtained by replacing the chloro group by bromo group, iodine group, fluorine group, mercapto group or hydroxyl group. The organic group Z also may be one having an amide structure and at least one characteristic group selected from a halogen atom, mercapto group and hydroxyl group.

Specific examples of the compound (A) in the formula (I), wherein n is 1 or 2, include chloromethyl methyldimethoxysilane, chloromethyl dimethylmethoxysilane, 2-chloroethyl methyldimethoxysilane, 2-chloroethyl dimethylmethoxysilane, 3-chloropropyl methyldimethoxysilane, 3-chloropropyl dimethylmethoxysilane, mercaptomethyl methyldimethoxysilane, mercaptomethyl dimethylmethoxysilane, 2-mercaptoethyl methyldimethoxysilane, 2-mercaptoethyl dimethylmethoxysilane, 3-mercaptopropyl methyldimethoxysilane, 3-mercaptopropyl dimethylmethoxysilane, and bis(chloromethyl)methylchlorosilane. Other compounds also may be used by replacing the methoxy group of the compounds mentioned above with chlorine group or an alkoxy group such as ethoxy group, n-propoxy group, iso-propoxy group, n-butoxy group and t-butoxy group.

Specific examples of the compound (A) in the formula (I), wherein n is 0, include chloromethyltrimethoxysilane, 2-chloroethyltrimethoxysilane, 3-chloropropyltrimethoxysilane, 2-chloropropyltrimethoxysilane, 4-chlorobutyltrimethoxysilane, 5-chloropentyltrimethoxysilane, 6-chlorohexyltmmethoxysilane, di(chloromethyl)dimethoxysilane, di(chloroethyl)dimethoxysilane, di(chloropropyl)dimethoxysilane, tri(chloromethyl)methoxysilane, tri(chloroethyl)methoxysilane, tri(chloropropyl)methoxysilane, mercaptomethyltrimethoxysilane, 2-mercaptoethyltrimethoxysilane, 3-mercaptopropyltrimethoxysilane, 2-mercaptopropyltrimethoxysilane, 4-mercaptobutyltrimethoxysilane, 5-mercaptopentyltrimethoxysilane, 6-mercaptohexyltrimethoxysilane, di(mercaptomethyl)dimethoxysilane, di(mercaptoethyl)dimethoxysilane, di(mercaptopropyl)dimethoxysilane, tri(mercaptomethyl)methoxysilane, tri(mercaptoethyl)methoxysilane, tri(mercaptopropyl)methoxysilane, fluoromethyltrimethoxysilane, 2-fluoroethyltrimethoxysilane, 3-fluoropropyltrimethoxysilane, bromomethyltrimethoxysilane, 2-bromoethyltrimethoxysilane, 3-bromopropyltrimethoxysilane, iodomethyltrimethoxysilane, 2-iodoethyltrimethoxysilane, 3-iodopropyltrimethoxysilane, (chloromethyl)phenyltrimethoxysilane, (chloromethyl)phenylethyltrimethoxysilane, 1-chloroethyltrimethoxysilane, 2-(chloromethyl)allyltrimethoxysilane, (3-chlorocyclohexyl)trimethoxysilane, (4-chlorocyclohexyl)trimethoxysilane, (mercaptomethyl)phenyltrimethoxysilane, (mercaptomethyl)phenylethyltrimethoxysilane, 1-mercaptoethyltrimethoxysilane, 2-(mercaptomethyl)allyltrimethoxysilane, (3-mercaptocyclohexyl)trimethoxysilane, (4-mercaptocyclohexyl)trimethoxysilane, N-(3-triethoxysilylpropyl)gluconamide, and N-(3-triethoxysilylpropyl)-4-hydroxybutylamide. In addition, other compounds also may be used by replacing the methoxy group of the compounds mentioned above with chlorine group or an alkoxy group such as ethoxy group, n-propoxy group, iso-propoxy group, n-butoxy group and t-butoxy group.

In particular, the compound (A) preferably contains at least one compound selected from chloromethyltrimethoxysilane, chloromethyltriethoxysilane, chloromethyltrichlorosilane, 2-chloroethyltrimethoxysilane, 2-chloroethyltriethoxysilane, 2-chloroethyltrichlorosilane, 3-chloropropyltrimethoxysilane, 3-chloropropyltriethoxysilane, 3-chloropropyltrichlorosilane, mercaptomethyltrimethoxysilane, mercaptomethyltriethoxysilane, mercaptomethyltrichlorosilane, 2-mercaptoethyltrimethoxysilane, 2-mercaptoethyltriethoxysilane, 2-mercaptoethyltrichlorosilane, 3-mercaptopropyltrimethoxysilane, 3-mercaptopropyltriethoxysilane, 3-mercaptopropyltrichlorosilane, (chloromethyl)phenyltrimethoxysilane, (chloromethyl)phenyltriethoxysilane, (chloromethyl)phenyltrichlorosilane, (chloromethyl)phenylethyltrimethoxysilane, (chloromethyl)phenylethyltriethoxysilane, (chloromethyl)phenylethyltrichlorosilane, (mercaptomethyl)phenyltrimethoxysilane, (mercaptomethyl)phenyltriethoxysilane, (mercaptomethyl)phenyltrichlorosilane, (mercaptomethyl)phenylethyltrimethoxysilane, (mercaptomethyl)phenylethyltriethoxysilane, (mercaptomethyl)phenylethyltrichlorosilane, hydroxymethyltrimethoxysilane, hydroxyethyltrimethoxysilane, hydroxypropyltrimethoxysilane, N-(hydroxyethyl)-N-methylaminopropyltrimethoxysilane, N-(3-triethoxysilylpropyl)gluconamide, and N-(3-triethoxysilylpropyl)-4-hydroxybutylamide.

Among these, the compound (A) preferably contains at least one compound selected from chloromethyltrialkoxysilane, chloromethyltrichlorosilane, 2-chloroethyltrialkoxysilane, 2-chloroethyltrichlorosilane, 3-chloropropyltrialkoxysilane, 3-chloropropyltrichlorosilane, mercaptomethyltrialkoxysilane, mercaptomethyltrichlorosilane, 2-mercaptoethyltrialkoxysilane, 2-mercaptoethyltrichlorosilane, 3-mercaptopropyltrialkoxysilane, 3-mercaptopropyltrichlorosilane, N-(3-trialkoxysilylpropyl)gluconamide, and N-(3-trialkoxysilylpropyl)-4-hydroxybutylamide. Employment of these compounds enables to obtain a gas barrier layered product with excellent transparency. Particularly preferred examples of the compound (A) include chloromethyltrimethoxysilane, chloromethyltriethoxysilane, 3-chloropropyltrimethoxysilane, 3-chloropropyltriethoxysilane, mercaptomethyltrimethoxysilane, mercaptomethyltriethoxysilane, 3-mercaptopropyltrimethoxysilane, and 3-mercaptopropyltriethoxysilane. Employment of these compounds for the compound (A) enables to obtain a gas barrier layered product having a gas barrier property and transparency both excellent. The present invention enables to obtain a gas barrier layered product with a haze value of up to 3% and having excellent transparency.

These compounds (A) may be obtained by employing commercially available ones or being synthesized by a known method.

The compound (L) further may include at least one compound (B) expressed by the chemical formula (II) below.

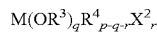  (II)

In the chemical formula (II), M denotes Si, Al, Ti, Zr, Cu, Ca, Sr, Ba, Zn, B, Ga, Y, Ge, Pb, P, Sb, V, Ta, W, La or Nd. M is preferably Si, Al, Ti or Zr, and particularly preferably Si or Al. In the chemical formula (II), $R^3$ denotes an alkyl group such as methyl group, ethyl group, n-propyl group, iso-propyl group, n-butyl group or t-butyl group, and is preferably methyl group or ethyl group. Also in the chemical formula (II), $X^2$ denotes a halogen atom. Examples of the halogen denoted by $X^2$ include chlorine, bromine and iodine, and chlorine is preferred. Also in the chemical formula (II), $R^4$ denotes an alkyl group, an aralkyl group, an aryl group or an alkenyl group. Examples of the alkyl group denoted by $R^4$ include methyl group, ethyl group, n-propyl group, iso-propyl group, n-butyl group, t-butyl group and n-octyl group. Examples of the aralkyl group denoted by $R^4$ include benzyl group, phenethyl group and trityl group. Examples of the aryl group denoted by $R^4$ include phenyl group, naphthyl group, tolyl group, xylyl group and mesityl group. Examples of the alkenyl group denoted by $R^4$ include vinyl group and allyl group. In the chemical formula (II), p is equal to the valence of a metal element M. In the chemical formula (II), q denotes an integer from 0 to p. In the chemical formula (II), r denotes an integer from 0 to p and $1 \leq q+r \leq p$ is given.

In any combination of the chemical formula (II) described above, M may be Si or Al.

In the chemical formulas (I) and (II), $R^1$ may be identical to or different from $R^3$.

Specific examples of the compound (B) include: silicon alkoxides such as tetramethoxysilane, tetraethoxysilane, methyltrimethoxysilane, ethyltrimethoxysilane, octyltrimethoxysilane, phenyltrimethoxysilane, vinyltrimethoxysilane, vinyltriethoxysilane, chlorotrimethoxysilane, chlorotriethoxysilane, dichlorodimethoxysilane, dichlorodiethoxysilane, trichloromethoxysilane and trichloroethoxysilane; halogenated silane such as vinyltrichlorosilane, tetrachlorosilane and tetrabromosilane; alkoxy titanium compounds such as tetramethoxytitanium, tetraethoxytitanium, tetraisopropoxytitanium and methyltriisopropoxytitanium; halogenated titanium such as tetrachlorotitanium; alkoxyaluminum compounds such as trimethoxyaluminum, triethoxyaluminum, trisopropoxyaluminum, methyldiisopropoxyaluminum, tributoxyaluminum and diethoxyaluminum chloride; and alkoxyzirconium compounds such as tetraethoxyzirconium, tetraisopropoxyzirconium and methyltriisopropoxyzirconium.

The composition forming the gas barrier layer of the gas barrier layered product of the present invention includes a hydrolyzed and condensed product of the compound (L). Hydrolysis of the compound (L) causes hydroxyl group to substitute for at least a part of the halogen and the alkoxy group of the compound (L). The hydrolysis product is then condensed to form a compound having a metal element bonded via oxygen. Repeating this condensation results in forming a compound that may be considered substantially as a metal oxide (such as silicon oxide).

The hydrolyzed and condensed product of the compound (L) contained in the gas barrier layer preferably has a condensation degree P, which is defined below, from 65% to 99%, more preferably from 70% to 99% and further preferably from 75% to 99%. The description below shows how to calculate the condensation degree P (%) of the hydrolyzed and condensed product of the compound (L).

Suppose the total number of the alkoxy groups and the halogen atoms in one molecule of the compound (L) is indicated by a. The proportion of the compound (L) is defined to be yi (%) in the whole compound (L) where the compound (L) has a total number of i as a sum of the condensed alkoxy groups and the halogen atoms in the hydrolyzed and condensed product of the compound (L). In this condition, a value of $\{(i/a) \times yi\}$ is calculated for each value of i, ranging from 1 to a (including 1 and a), and all the obtained values are added. That is, the condensation degree P (%) is defined by the following mathematical expression.

$$P = \sum_{i=1}^{a} \{(i/a) \times yi\} \quad \text{[Mathematical Expression 1]}$$

The value of yi in the hydrolyzed and condensed product of the compound (L) in the gas barrier layer may be determined by solid-state NMR (the DD/MAS method), for example.

The hydrolyzed and condensed product are manufactured by, for example, a technique that is used in a known sol-gel method using a raw material such as the compound (L), a partially hydrolyzed product of the compound (L), a completely hydrolyzed product of the compound (L), a partially hydrolyzed and condensed product of the compound (L), a partial condensate of a completely hydrolyzed product of the compound (L), or a combination of them. These raw materials may be obtained by manufacturing using a known method or may employ commercially available raw materials. Although the raw material is not particularly limited, it may employ condensate obtained by hydrolysis and condensation of approximately from 2 to 10 molecules, for example. Specifically, the raw material may employ, for example, a linear condensate from dimer to decamer obtained by hydrolysis and condensation of tetramethoxysilane.

It is possible to control the number of molecules to be condensed in the hydrolyzed and condensed product of the compound (L) in the composition forming the gas barrier layer by adjusting the factors such as the quantity of water, the type and concentration of catalyst and the temperature for the hydrolysis and condensation.

Although the method of manufacturing the hydrolyzed and condensed product of the compound (L) is not particularly limited, the hydrolysis and condensation may be carried out by adding water, acid, and alcohol to the raw materials mentioned above according to a typical example of the sol-gel method.

Although the compound (L) may be referred to as metal alkoxide (a compound containing metal having an alkoxy group bonded thereto) in the description below, a compound containing metal having halogen bonded thereto may be employed instead of the metal alkoxide.

In the case of the compound (L) containing the compound (B), the molar ratio of the compound (A) and the compound (B) contained in the compound (L) is preferably in the range of the compound (A)/the compound (B)=from 0.1/99.9 to 40/60, more preferably from 0.5/99.9 to 30/70 and most preferably from 1/99 to 20/80 (for example, from 5/95 to 20/80). The combined use of the compound (A) and the compound (B) in the ratio enables to obtain a gas barrier layered product with excellent properties such as a gas barrier property, mechanical properties such as tensile strength and elongation, appearance, and ease of handling.

The content of inorganic components derived from the compound (L) in the composition forming the gas barrier layer is preferably in the range from 5 wt % to 50 wt % for a better gas barrier property of the gas barrier layered product. The content is more preferably in the range from 10 wt % to 45 wt % and further preferably in the range from 15 wt % to 40 wt %. The content of the inorganic components in the composition is calculated from the weight of the raw materials used for preparing the composition. That is, suppose a metal oxide is obtained by completely hydrolyzing and condensing the compound (L), a partially hydrolyzed product of the compound (L), a completely hydrolyzed product of the compound (L), a partially hydrolyzed and condensed product of the compound (L), a partial condensate of a completely hydrolyzed product of the compound (L), or a combination of them, the weight of the metal oxide is calculated. The weight of the metal oxide thus calculated is considered as the weight of the inorganic components in the composition, and the content of the inorganic components is calculated. When an inorganic additive is added that are described later such as metal salt, a metal complex and a metal oxide, the added weight of the inorganic additive is added simply to the weight of the inorganic components. More specifically, the weight of the metal oxide is calculated as follows. When the compound (A) expressed by the chemical formula (I) is completely hydrolyzed and condensed, it forms a compound expressed by the formula $SiO_{(m+k)/2}R^2{}_n Z_{4-m-n-k}$. The part expressed by $SiO_{(m+k)/2}$ is a metal oxide in this compound. Z and $R^2$ are considered not as inorganic components but as an organic component. When the compound (B) expressed by the chemical formula (II) is completely hydrolyzed and condensed, it forms a compound expressed by the formula $MO_{(q+r)/2}R^4{}_{p-q-r}$. The part expressed by $MO_{(q+r)/2}$ is a metal oxide in this compound.

The composition forming the gas barrier layer contains a neutralized product of a polymer containing at least one functional group selected from carboxyl group and a carboxylic anhydride group. The content of the neutralized product of the polymer in the composition is not particularly limited, and it may be, for example, in the range from 50 wt % to 95 wt %. The neutralized product of the polymer is obtained by neutralizing, by a metal ion having a valence of two or more, at least a part of at least one functional group selected from carboxyl group and a carboxylic anhydride group contained in a polymer (hereinafter, also may be referred to as a "carboxylic acid containing polymer"). The carboxylic acid containing polymer has at least two carboxyl groups or at least one carboxylic anhydride group in one molecule of the polymer. Specifically, the polymer can employ a polymer containing, in one molecule thereof, at least two structure units, each of which has at least one carboxyl group such as acrylic acid units, methacrylic acid units, maleic acid units, and itaconic acid units. It also can employ a polymer containing a structure unit having a structure of carboxylic anhydride such as a maleic anhydride unit and a phthalic anhydride unit. The polymer may contain one or more types of the structure units having at least one carboxyl group and/or the structure units having the structure of a carboxylic anhydride (hereinafter both of them may be abbreviated as a "carboxylic acid containing unit (C)").

Determining the content of the carboxylic acid containing unit (C) as at least 10 mol % in all the structure units of the carboxylic acid containing polymer enables to obtain a gas barrier layered product with an excellent gas barrier property in a highly humid condition. The content is more preferably at least 20 mol %, further preferably at least 40 mol % and particularly preferably at least 70 mol % (80 mol %, for example). When the carboxylic acid containing polymer includes both the structure unit containing at least one carboxyl group and the structure unit having the structure of carboxylic anhydride, the sum of the contents should be in the range described above.

The carboxylic acid containing polymer may contain other structure units in addition to the carboxylic acid containing unit (C). For example, the carboxylic acid containing polymer may include at least one structure unit derived from (meth) acrylate esters such as methyl acrylate unit, methyl methacrylate unit, ethyl acrylate unit, ethyl methacrylate unit, butyl acrylate unit and butyl methacrylate unit. It also may include at least one structure unit derived from vinyl esters such as vinyl formate unit and vinyl acetate unit. It also may include styrene unit and p-styrenesulfonic acid unit. It also may include at least one structure unit derived from olefins such as ethylene unit, propylene unit, and isobutylene unit. When the carboxylic acid containing polymer includes at least two structure units, the carboxylic acid containing polymer may take any form of an alternating copolymer, a random copolymer, a block copolymer and a gradient copolymer.

Preferable examples of the carboxylic acid containing polymer include polyacrylic acid, polymethacrylic acid and poly(acrylic acid/methacrylic acid). The carboxylic acid containing polymer may be one type of or a mixture of at least two types of polymers. For example, it may employ at least one selected from polyacrylic acid polymer and polymethacrylic acid polymer. Specific examples of the carboxylic acid containing polymer including other structure units as described above include ethylene-maleic anhydride copolymer, styrene-maleic anhydride copolymer, isobutylene-maleic anhydride alternating copolymer, ethylene-acrylic acid copolymer, and saponified product of ethylene-ethyl acrylate copolymer.

The molecular weight of the carboxylic acid containing polymer is not particularly limited. To obtain a gas barrier layered product with an excellent gas barrier property and excellent mechanical properties such as drop impact strength, the number average molecular weight is preferably at least 5,000, more preferably at least 10,000 and further preferably at least 20,000. Although the carboxylic acid containing polymer does not have any particular upper limit of the molecular weight, it is 1,500,000 or less in general.

The molecular weight distribution of the carboxylic acid containing polymer also is not particularly limited. To obtain the gas barrier layered product with better properties such as surface appearance and storage stability of a solution (S) described later, the molecular weight distribution indicated by a ratio of the weight average molecular weight/the number average molecular weight of the carboxylic acid containing polymer is preferably in the range from 1 to 6, more preferably in the range from 1 to 5 and further preferably in the range from 1 to 4.

The polymer forming the gas barrier layer of the gas barrier layered product of the present invention is obtained by neutralizing at least a part of at least one functional group (hereinafter, also may be referred to as a "functional group (F)") selected from carboxyl group and a carboxylic anhydride group of the carboxylic acid containing polymer, by a metal ion having a valence of two or more. In other words, the polymer contains carboxyl group neutralized by a metal ion having a valence of two or more.

The polymer forming the gas barrier layer has, for example, at least 10 mol % (for instance, at least 15 mol %) of the —COO— groups contained in the functional group (F) neutralized by metal ions having a valence of two or more. The carboxylic anhydride group is considered to include two —COO— groups. That is, in the case of the copolymer having a mol of carboxyl group and b mol of carboxylic anhydride group, the contained amount of the —COO— groups is (a+2b) mol in total. The ratio of the —COO— groups neutralized by metal ions having a valence of two or more to the —COO— groups contained in the functional group (F) is preferably at least 20 mol %, more preferably at least 30 mol %, further preferably at least 40 mol %, and particularly preferably at least 50 mol % (for example, at least 60 mol %). Although the ratio of the —COO— groups neutralized by metal ions having a valence of two or more to the —COO— groups contained in the functional group (F) does not have any particular upper limit, the ratio may be up to 95 mol %, for example. The gas barrier layered product of the present invention exhibits an excellent gas barrier property in both a dried condition and a highly humid condition by neutralizing, by metal ions having a valence of two or more, the carboxyl group and/or the carboxylic anhydride group in the carboxylic acid containing polymer.

The neutralization degree (the ionization degree) of the functional group (F) can be determined by measuring the infrared absorption spectrum of the gas barrier layered product using the ATR (attenuated total reflection) method, or by scraping the gas barrier layer off the gas barrier layered product and then measuring the infrared absorption spectrum using the KBr method. The peak attributed to C=O stretching vibration of the carboxyl group or the carboxylic anhydride group before neutralization (before ionization) is observed in the range from $1600\,cm^{-1}$ to $1850\,cm^{-1}$, and that after the neutralization (the ionization) is observed in the range from $1500\,cm^{-1}$ to $1600\,cm^{-1}$. Accordingly, their infrared absorption spectra can be evaluated separately. Specifically, the ratio between them is determined from the maximum absorbances in both ranges, and the ionization degree of the polymer forming the gas barrier layer in the gas barrier layered product is calculated using a calibration curve prepared beforehand. Measuring infrared absorption spectra of a plurality of standard samples with different neutralization degrees enable to prepare the calibration curve.

It is important for the metal ions neutralizing the functional group (F) to have a valence of two or more. The obtained layered product does not have an excellent gas barrier property with the functional group (F) not yet neutralized or neutralized only by monovalent ions described later. The gas barrier layered product, however, has reduced haze and a good surface appearance with the functional group (F) neutralized by a small amount of monovalent ions (cations) in addition to metal ions with a valence of two or more. Thus, the present invention includes the functional group (F) of the carboxylic acid containing polymer neutralized by both the metal ions having a valence of two or more and the monovalent ions. Examples of the metal ions having a valence of two or more include calcium ion, magnesium ion, divalent iron ion, trivalent iron ion, zinc ion, divalent copper ion, lead ion, divalent mercury ion, barium ion, nickel ion, zirconium ion, aluminum ion and titanium ion. For example, at least one ion selected from calcium ion, magnesium ion, barium ion and zinc ion may be used as the metal ion having a valence of two or more.

In the present invention, 0.1 to 10 mol % of the —COO— groups contained in the functional group (F) (the carboxyl group and/or the carboxylic anhydride) of the carboxylic acid containing polymer may be neutralized by monovalent ions. Transparency of the composition generally improved by neutralized by monovalent ions. The excessively high degree of neutralization by monovalent ions may lower the gas barrier property of the gas barrier layered product and the stability of the composition solution. The neutralization degree of the functional group (F) by monovalent ions is more preferably in the range from 0.5 to 5 mol % and further preferably in the range from 0.7 to 3 mol %. Examples of the monovalent ions include ammonium ion, pyridinium ion, sodium ion, potassium ion and lithium ion, and ammonium ion is preferred among them.

The compound (D) is capable of bonding to both the —COO— groups contained in the carboxylic acid containing polymer and a group on the surface of the hydrolyzed and condensed product. Examples of the group on the surface of the hydrolyzed and condensed product to which the compound (D) bonds include at least one group selected from a group consisting of hydroxyl group, an alkoxy group and a halogen atom, and it may be hydroxyl group in a silanol group, for example.

Bonding the compound (D) to both the polymer and the hydrolyzed and condensed product bonds the polymer and the hydrolyzed and condensed product via the compound (D).

An example of the compound (D) is a titanium compound and/or a zirconium compound including a first atomic group and a second atomic group, the first atomic group capable of bonding to the hydroxyl groups, the alkoxy groups or the halogen atoms on the surface of the hydrolyzed and condensed product and the second atomic group capable of bonding to the —COO— groups contained in the carboxylic acid containing polymer. The first and the second atomic groups may be identical atomic groups and also may be different atomic groups.

The compound (D) may be a titanium compound such as tetraisopropoxy titanium, tetranormalbutoxy titanium, butoxy titanium dimer, tetra(2-ethylhexyloxy)titanium, tetramethoxy titanium, tetraethoxy titanium, titanium acetylacetonate, titanium tetraacetylacetonate, polytitanium acetylacetonate, titanium ethylacetoacetate, titanium octane diolate, titanium lactate, titanium triethanolaminate and polyhydroxy titanium stearate. The compound (D) also may be an organic zirconium compound such as zirconium normalpropylate, zirconium normalbutylate, zirconium tetraacetylacetonate, zirconium monoacetylacetonate, zirconium bisacetylacetonate, zirconium monoethylacetoacetate, zirconium acetylacetonate bisethyl acetoacetonate, zirconium acetate, zirconium tributoxy stearate, zirconium oxychloride 8-hydrate.

Among these, alkoxy titanium (particularly tetraalkoxy titanium) is employed preferably as the compound (D). Examples of tetraalkoxy titanium include tetraisopropoxy titanium, tetranormalbutoxy titanium, tetramethoxy titanium and tetraethoxy titanium.

A proportion of the amount of the compound (D) to the amount of the —COO— groups in the carboxylic acid containing polymer is preferably in a range from 0.01 mol % to 50 mol %, more preferably from 0.05 mol % to 10 mol %, and further preferably from 0.1 mol % to 5 mol %. The proportion of the compound (D) less than 0.01 mol % causes deterioration in water resistance of the gas barrier layered product. The proportion more than 50 mol %, in contrast, causes lowering the gas barrier property and tends to increase the viscosity of the composition solution. For this reason, the proportion of more than 50 mol % may cause difficulty in application of the composition solution to form a layer.

A typical example may have the compound (L) is free from a titanium compound and a zirconium compound, and the compound (D) includes a titanium compound and/or a zirconium compound. For example, the compound (L) may be a silicon compound and an aluminum compound, and the compound (D) may be a titanium compound and/or a zirconium compound. The compound (L) also may be a silicon compound and the compound (D) also may be a titanium compound.

The composition forming the gas barrier layer may include, as long as the effects of the present invention are obtained, the following substances: inorganic acid metal salt such as carbonate, hydrochloride, nitrate, hydrogen carbonate, sulfate, hydrogen sulfate, phosphate, borate, and aluminate; organic acid metal salt such as oxalate, acetate, tartrate, and stearate; a metal complex such as a cyclopentadienyl metal complex like titanocene, and a cyano metal complex; a layered clay compound, a crosslinker, polyalcohols, high molecular compounds other than those, a plasticizer, an antioxidant, an ultraviolet absorber, a flame retardant, etc. The composition forming the gas barrier layer also may include: fine powder of the metal oxide produced by hydrolyzing and condensing the metal alkoxide by a wet process; fine powder of the metal oxide prepared by hydrolyzing, condensing, or burning metal alkoxide by a dry process; or fine silica powder prepared from water glass.

The gas barrier layered product of the present invention shows a better surface appearance by containing polyalcohols in the composition forming the gas barrier layer. More specifically, containing polyalcohols results in developing less cracks while manufacturing the gas barrier layered product and makes it possible to obtain a gas barrier layered product with a good surface appearance.

Such polyalcohols to be used for the present invention are compounds that have at least two hydroxyl groups in a molecule, and they include compounds with molecular weights ranging from low to high. Such polyalcohols are preferably macromolecular compounds such as polyvinyl alcohol, partially saponified polyvinyl acetate, ethylene-vinyl alcohol copolymer, polyethylene glycol, polyhydroxyethyl(meth)acrylate, polysaccharide such as starch, and a polysaccharide derivative derived from polysaccharide such as starch.

The polyalcohols mentioned above are used preferably in an amount within the range, in terms of the weight ratio of the carboxylic acid containing polymer/the polyalcohols, from 10/90 to 99.5/0.5. The weight ratio is more preferably in the range from 30/70 to 99/1, further preferably 50/50 to 99/1, and most preferably 70/30 to 98/2.

The gas barrier layered product of the present invention has a gas barrier layer of a composition formed on at least one surface of the base material. The composition includes a hydrolyzed and condensed product of the compound (L) mentioned above and a neutralized product of a carboxyl group containing polymer. This gas barrier layer may be formed on only one surface or on both surfaces of the base material. The layered product with a gas barrier layer formed on both surfaces of the base material has an advantage in easy processing after fabrication such as attaching another film.

The thickness of the gas barrier layer is not particularly limited, but it is preferably in the range from 0.1 µm to 100 µm. The gas barrier layered product having a gas barrier layer with a thickness of less than 0.1 µm may have an insufficient gas barrier property. The gas barrier layered product having a gas barrier layer with a thickness of more than 100 µm may easily develop cracks in the gas barrier layer during processes and transportation, and while in use. The gas barrier layer more preferably has a thickness in the range from 0.1 µm to 50 µm and further preferably in the range from 0.1 µm to 20 µm.

The base material forming the gas barrier layered product of the present invention may employ base materials formed of various materials. The base material may employ, for example, the following materials: films such as a thermoplastic resin film and a thermosetting resin film; fiber aggregates such as fabrics and papers; wood; and films of specified shapes formed of a metal oxide and metal. Among them, the thermoplastic resin film is particularly useful as a base material of the gas barrier layered product for a food packaging material. The base material may have a multilayered structure formed of a plurality of materials.

The thermoplastic resin film may be the formed and processed films of, for example, the following substances: polyolefin-based resin such as polyethylene and polypropylene; polyester-based resin such as polyethylene terephthalate, polyethylene-2,6-naphthalate, polybutylene terephthalate and copolymers of them; polyamide-based resin such as nylon 6, nylon 66 and nylon 12; and polystyrene, poly(meth) acrylic ester, polyacrylonitrile, polyvinyl acetate, polycarbonate, polyarylate, regenerated cellulose, polyimide, polyetherimide, polysulfone, polyethersulfone, polyetherether ketone and ionomer resins. Layered products for food packaging materials preferably employ a base material of a film formed of polyethylene, polypropylene, polyethylene terephthalate, nylon 6, or nylon 66.

The gas barrier layered product of the present invention also may include a layer (for example, a thermoplastic resin film or paper) other than the base material and the gas barrier layer. Including such other layer provides a heat-sealing property to the gas barrier layered product or improve dynamic properties.

Specific examples of the gas barrier layered product of the present invention are listed below in the case of using a thermoplastic resin film for the base material.

Examples of the structure of the gas barrier layered product of the present invention include the following structures: a gas barrier layer/polyester/polyamide/polyolefin, a gas barrier layer/polyester/a gas barrier layer/polyamide/polyolefin, polyester/a gas barrier layer/polyamide/polyolefin, a gas barrier layer/polyamide/polyester/polyolefin, a gas barrier layer/polyamide/a gas barrier layer/polyester/polyolefin, polyamide/a gas barrier layer/polyester/polyolefin, a gas barrier layer/polyolefin/polyamide/polyolefin, a gas barrier layer/polyolefin/a gas barrier layer/polyamide/polyolefin, polyolefin/a gas barrier layer/polyamide/polyolefin, a gas barrier layer/polyamide/polyolefin, a gas barrier layer/polyolefin/polyolefin, a gas barrier layer/polyolefin/a gas barrier layer/polyolefin, polyolefin/a gas barrier layer/polyolefin, a gas barrier layer/polyester/polyolefin, a gas barrier layer/polyester/a gas barrier layer/polyolefin, polyester/a gas barrier layer/polyolefin, a gas barrier layer/polyamide/polyolefin, a gas barrier layer/polyamide/a gas barrier layer/polyolefin, polyamide/a gas barrier layer/polyolefin, a gas barrier/polyester/paper, a gas barrier layer/polyamide/paper, a gas barrier layer/polyolefin/paper. The polyolefin is preferably polypropylene or polyethylene, the polyester is preferably polyethylene terephthalate (PET), and the polyamide is preferably nylon 6 for the heat-sealing and dynamic properties of the gas barrier layered product. Each layer may be provided with another layer in between, for example, an adhesive layer or an anchor coat layer, as needed.

The gas barrier layered product of the present invention shows a high gas barrier property. According to the present invention, a layered product can be obtained that have the oxygen transmission rate of up to 1.0 $cc/m^2 \cdot day \cdot atm$ in the 20° C. 85% RH atmosphere.

A slip property of the film is an important property has effect on handling and smooth processing during the processes after fabrication such as printing and laminating. A poor slip property causes wrinkles not to be removed easily that are formed when the film touches the roll or while the film is reeled in, resulting in poor appearance such as folded wrinkles. The poor slip property also causes a serpentine movement of the film and the film fails in being reeled stably, and in the worst case, the film twists around the roll to break itself and stop the facilities, resulting in considerable lowering in productivity. The layered product of the present invention makes it possible to exhibit an excellent slip property and avoid troubles as described above.

(Method of Manufacturing Gas Barrier Layered Product)

Hereinafter, the method of manufacturing a gas barrier layered product of the present invention is described. According to this method, the gas barrier layered product of the present invention can be manufactured easily. The materials and the structure of the layered product for the manufacturing method of the present invention are the same as those described above, and thus repetitive description may be omitted.

The manufacturing method of the present invention includes (i) preparing a mixed solution (hereinafter, may be referred to as a "mixed solution (S)") of a compound (D), a hydrolyzed and condensed product of at least one compound (L) containing a metal atom to which at least one group selected from a halogen atom and an alkoxy group is bonded, and a polymer containing at least one functional group selected from carboxyl group and a carboxylic anhydride group. They are mixed in a solvent. As described above, the compound (L) includes at least one compound (A) in which a metal atom bonded to an organic group having at least one characteristic group selected from a halogen atom, mercapto group, and hydroxyl group. The compound (D) is a compound bonding to both a group on the surface of the hydrolyzed and condensed product and a —COO— group contained in at least one functional group of the above polymer. The polymer for the step (i) is the carboxylic acid containing polymer described above.

In the step (i), the mixed solution (S) is preferably obtained by mixing the compound (D) and the hydrolyzed and condensed product of the compound (L), followed by further mixing the carboxylic acid containing polymer. The hydrolyzed and condensed product is prepared first and then mixed with the compound (D) to bond the compound (D) to the group on the surface of the hydrolyzed and condensed product. Then, adding the polymer bonds the compound (D) to the —COO— groups of the polymer, where the compound (D) is bonded to the surface of the hydrolyzed and condensed product. As a result, the hydrolyzed and condensed product is bonded to the polymer via the compound (D).

As described above, the compound (L) may employ, for example, a compound expressed by the chemical formula (I) or (II). The material for the hydrolyzed and condensed product of the compound (L) may be at least one compound containing metal element (hereinafter, also may be referred to as a "compound (L) component") selected from a partially hydrolyzed product of the compound (L), a completely hydrolyzed product of the compound (L), a partially hydrolyzed and condensed product of the compound (L), and a partial condensate of a completely hydrolyzed product of the compound (L).

The carboxylic acid containing polymer in the mixed solution (S) may have a part (for example, from 0.1 mol % to 10 mol %) of the —COO— groups contained in the functional group (F) neutralized by monovalent ions.

Next, (ii) a layer is formed on the base material by applying the mixed solution (S) on the base material and dried. The mixed solution (S) may be dried by removing the solvent contained in the mixed solution (S).

Then, (iii) the layer formed on the base material is brought into contact with a solution containing a metal ion with a valence of two or more (hereinafter, this step also may be referred to as "ionization process"). Through this step, divalent metal ions neutralize at least a part of the functional group (F) (carboxylic acid and/or carboxylic anhydride) contained in the carboxylic acid containing polymer in the layer. The proportion to be neutralized by divalent metal ions (the ionization degree) at this step is controllable by adequately adjusting conditions such as the temperature of the solution containing the metal ions, the concentration of the metal ions, and the time length for immersing in the solution containing the metal ions.

As described above, preferably at least 10 mol % of the —COO— groups contained in the functional group (F) is neutralized by metal ions with a valence of two or more in the step (iii).

The ionization process may be carried out by, for example, spraying the solution containing the metal ions with a valence of two or more on the formed layer, or immersing both the base material and the layer on the base material in the solution containing the metal ions with a valence of two or more.

Hereinafter, the layered product before the ionization process also may be referred to as a layered product (A), and the layered product after the ionization process as a layered product (B).

An example of a method for preparing the mixed solution (S) is described below. In this example, the solution of the carboxylic acid containing polymer and the dispersion of the hydrolyzed and condensed product are prepared separately.

The solvent used for dissolving the carboxylic acid containing polymer may be selected according to the type of the carboxylic acid containing polymer. For example, water is preferred for a water-soluble polymer such as polyacrylic acid polymer and polymethacrylic acid polymer. Water containing an alkaline material such as ammonia, sodium hydroxide, or potassium hydroxide is preferred for polymers such as isobutylene-maleic anhydride copolymer and styrene-maleic anhydride copolymer. The solvent also may contain the following substances, as long as not inhibiting the carboxylic acid containing polymer from dissolving: alcohols such as methanol and ethanol; ethers such as tetrahydrofuran, dioxane and trioxane; ketones such as acetone and methyl ethyl ketone; glycols such as ethylene glycol and propylene glycol; glycol derivatives such as methyl cellosolve, ethyl cellosolve and n-butyl cellosolve; glycerin; and acetonitrile, dimethylformamide, dimethylsulfoxide, sulfolane, and dimethoxyethane.

The hydrolyzed and condensed product of the compound (L) is obtained by hydrolyzing and condensing the compound (L) component in a reaction system including the compound (L) component, an acid catalyst, water, and, as needed, an organic solvent. Specifically, techniques employed for known sol-gel methods are applicable. Employment of the compound (L) for the compound (L) component makes it possible to obtain a gas barrier layered product with a better gas barrier property.

The acid catalyst used for the hydrolysis and condensation reaction may employ a known acid catalyst, and it may be, for example, hydrochloric acid, sulfuric acid, nitric acid, p-toluenesulfonic acid, benzoic acid, acetic acid, lactic acid, butanoic acid, carbonic acid, oxalic acid, and maleic acid. Among them, hydrochloric acid, sulfuric acid, nitric acid, acetic acid, lactic acid, and butanoic acid are particularly preferable. Although a preferred amount of the acid catalyst to be used varies depending on the type of the catalyst to be used, it is preferably in the range from $1 \times 10^{-5}$ to 10 mol for 1 mol of metal atoms of the compound (L) component, more preferably in the range of $1 \times 10^{-4}$ to 5 mol, and further preferably in the range of $5 \times 10^{-4}$ to 1 mol. A gas barrier layered product with an excellent gas barrier property is obtained as long as the acid catalyst is used within this range.

Although a preferred amount of the water used in the hydrolysis and condensation reaction varies depending on the type of the compound (L) component, it is preferably in the range from 0.05 to 10 mol for 1 mol of the alkoxy group or the halogen atoms (when the both are mixed, 1 mol in total) of the compound (L) component, more preferably in the range of 0.1 to 4 mol, and further preferably in the range of 0.2 to 3 mol. A gas barrier layered product to be obtained has a particularly excellent gas barrier property, as long as the water is used within this range. When using a component containing water such as hydrochloric acid in the hydrolysis and condensation reaction, the amount of water to be used is preferably determined by considering the amount of water to be introduced by the component.

An organic solvent may be used in the hydrolysis and condensation reaction system, as needed. The organic solvent to be used is not particularly limited, as long as it dissolves the compound (L) component. For example, alcohols such as methanol, ethanol, isopropanol, and normal propanol are used suitably as the organic solvent, and alcohol having a molecular structure (an alkoxy component) of the same type as that of the alkoxy group contained in the compound (L) component is used more suitably. Specifically, methanol is preferred for tetramethoxysilane, and ethanol is preferred for tetraethoxysilane. Although the amount of the organic solvent to be used is not particularly limited, it preferably satisfies the concentration of the compound (L) component to be from 1 wt % to 90 wt %, more preferably from 10 wt % to 80 wt %, and further preferably from 10 wt % to 60 wt %.

Although the temperature of the reaction system during the hydrolysis and condensation of the compound (L) component in the reaction system is not necessarily limited, it is generally in the range from 2° C. to 100° C., preferably in the range from 4° C. to 60° C., and more preferably in the range from 6° C. to 50° C. Although the reaction time length varies depending on the reaction conditions such as the amount and type of the catalyst, it is generally in the range from 0.01 hour to 60 hours, preferably in the range from 0.1 hour to 12 hours, and more preferably in the range from 0.1 hour to 6 hours. The atmosphere of the reaction system also is not necessarily limited, and it may employ an air atmosphere, a carbon dioxide atmosphere, an argon atmosphere, or a nitrogen gas stream atmosphere.

In the hydrolysis and condensation reaction, the entire compound (L) component may be added to the reaction system at once, or the compound (L) component may be added to the reaction system little by little at separate times. The total amount of the compound (L) component used in both cases preferably satisfies the suitable ranges mentioned above. The oligomer (the hydrolyzed and condensed product) prepared by the hydrolysis and condensation reaction preferably has a condensation degree of approximately from 25% to 60% indicated by the condensation degree P mentioned above.

The compound (D) is added to the dispersion of the hydrolyzed and condensed product of the compound (L). The compound (D) is generally added in a form of a solution of the compound (D). The solvent for the solution of the compound (D) is not particularly limited as long as it can dilute the compound (D) stably, and for example, it may employ alcohols such as methanol, ethanol, and isopropanol, ethers such as ethylene glycol dimethyl ether, ethylene glycol diethyl ether and tetrahydrofuran, or ketones such as acetone and methyl ethyl ketone.

Then, the dispersion added with the compound (D) and the solution of the carboxylic acid containing polymer are mixed to obtain the mixed solution (S). For the better stability of the mixed solution (S) and the better gas barrier property of the gas barrier layered product to be obtained, the pH of the mixed solution (S) is preferably in the range from 1.0 to 7.0, more preferably in the range from 1.0 to 6.0, and further preferably in the range from 1.5 to 4.0.

The pH of the mixed solution (S) can be controlled by a known method, and for example, it is controlled by adding an acid compound such as hydrochloric acid, nitric acid, sulfuric acid, phosphoric acid, acetic acid, butanoic acid, and ammonium sulfate, or a basic compound such as sodium hydroxide, potassium hydroxide, ammonia, trimethylamine, pyridine, sodium carbonate, and sodium acetate. For the control, using a basic compound to introduce monovalent cations into the solution gives an effect of neutralizing a part of the carboxyl group and/or the carboxylic anhydride group of the carboxylic acid containing polymer by the monovalent ions.

The viscosity of the mixed solution (S) may be controlled to fall within the ranges above by, for example, a method such as adequately adjusting the concentration of the solid content, adequately adjusting the pH, or adding a viscosity modifier such as carboxymethyl cellulose, starch, bentonite, tragacanth gum, stearate, alginate, methanol, ethanol, n-propanol, and isopropanol.

For easy application of the mixed solution (S) to the base material, an organic solvent that can be mixed with the mixed solution (S) uniformly may be added to the mixed solution (S) as long as the stability of the mixed solution (S) is not impaired. Examples of the organic solvent that can be added include the following substances: lower alcohols such as methanol, ethanol, n-propanol, and isopropanol; ethers such as tetrahydrofuran, dioxane, and trioxane; ketones such as acetone, methyl ethyl ketone, methyl vinyl ketone, and methyl isopropyl ketone; glycols such as ethylene glycol, and propylene glycol; glycol derivatives such as methyl cellosolve, ethyl cellosolve, and n-butyl cellosolve; glycerin; and acetonitrile, dimethylformamide, dimethylacetamide, dimethylsulfoxide, sulfolane, and dimethoxyethane.

The mixed solution (S) also may include the following substances, as long as the effects of the present invention are obtained: inorganic acid-metal salt such as carbonate, hydrochloride, nitrate, hydrogen carbonate, sulfate, hydrogen sulfate, phosphate, borate, and aluminate; organic acid metal salt such as oxalate, acetate, tartrate, and stearate; a metal complex such as a cyclopentadienyl metal complex like titanocene, and a cyano metal complex; and a layered clay compound, a crosslinker, the polyalcohols mentioned above, high molecular compounds other than those, a plasticizer, an antioxidant, an ultraviolet absorber, and a flame retardant. The mixed solution (S) also may include the following substances: fine powder of the metal oxide produced by hydrolyzing and condensing the metal alkoxide above by a wet process; fine powder of the metal oxide produced by hydrolyzing, condensing, or burning metal alkoxide by a dry process; and fine silica powder prepared from water glass.

The amount of polyalcohols to be added to the mixed solution (S) preferably satisfies the weight ratio of the carboxylic acid containing polymer/the polyalcohols in the range from 10/90 to 99.5/0.5. The range of the weight ratio is more preferably from 30/70 to 99/1, further preferably from 50/50 to 99/1, and most preferably from 70/30 to 98/2.

The mixed solution (S) thus prepared is applied to at least one surface of the base material. Before applying the mixed solution (S), the surface of the base material may be treated with a known anchor coating agent, or a known adhesive may be applied to the surface of the base material. The method for applying the mixed solution (S) to the base material is not particularly limited and a known method may be employed. Preferred examples of the method include casting, dipping, roll coating, gravure coating, screen printing, reverse coating, spray coating, kit coating, die coating, meteling bar coating, chamber doctor coating and curtain coating.

By applying the mixed solution (S) to the base material and then removing the solvent contained in the mixed solution (S), a layered product before subjected to the ionization process (a layered product (A)) is obtained. The method of removing the solvent is not particularly limited and a known method is applicable. Specifically, methods such as hot-air drying, hot roll contact, infrared heating, and microwave heating are applicable individually or in combination. The drying temperature is not particularly limited as long as it is at least 15° C. to 20° C. lower than the flow start temperature of the base material and also is at least 15° C. to 20° C. lower than the thermal decomposition start temperature of the carboxylic acid containing polymer. The drying temperature is preferably in the range from 80° C. to 200° C., more preferably in the range from 100 to 180° C., and further preferably in the range from 110 to 180° C. The solvent can be removed under either a normal pressure or a reduced pressure.

The layered product (A) obtained through the process mentioned above is brought into contact with a solution (hereinafter, also may be referred to as a "solution (MI)") containing metal ions with a valence of two or more (ionization process) for obtaining the gas barrier layered product of the present invention. The ionization process may be carried out at any stage, as long as the effects of the present invention are not impaired. For example, the ionization process can be carried out before or after the layered product is processed into the form of a packaging material, or after the packaging material is filled with contents and sealed.

The solution (MI) is prepared by dissolving, in a solvent, a compound (a polyvalent metal compound) that releases the metal ions with a valence of two or more upon dissolution. Although the solvent for preparing the solution (MI) desirably is water, it may be a mixture of water and an organic solvent that can be mixed with water. Examples of such a solvent include the following organic solvents: lower alcohols such as methanol, ethanol, n-propanol, and isopropanol; ethers such as tetrahydrofuran, dioxane, and trioxane; ketones such as acetone, methyl ethyl ketone, methyl vinyl ketone, and methyl isopropyl ketone; glycols such as ethylene glycol, and propylene glycol; glycol derivatives such as methyl cellosolve, ethyl cellosolve, and n-butyl cellosolve; glycerin; and acetonitrile, dimethylformamide, dimethylacetamide, dimethylsulfoxide, sulfolane, and dimethoxyethane.

The polyvalent metal compound may employ the compound that releases metal ions (i.e. metal ions with a valence of two or more) mentioned as examples for the gas barrier layered product of the present invention. Examples of the substances to be employed include calcium acetate, calcium hydroxide, calcium chloride, calcium nitrate, calcium carbonate, magnesium acetate, magnesium hydroxide, magnesium chloride, magnesium carbonate, iron(II) acetate, iron (II) chloride, iron(III) acetate, iron(III) chloride, zinc acetate, zinc chloride, copper(II) acetate, copper(III) acetate, lead acetate, mercury(II) acetate, barium chloride, barium sulfate, nickel sulfate, lead sulfate, zirconium chloride, zirconium nitrate, aluminum sulfate, potassium alum ($KAl(SO_4)_2$), and titanium(IV) sulfate. The polyvalent metal compounds may be selected only one to be used or used in combination. Preferred examples of the polyvalent metal compound include calcium acetate, calcium hydroxide, magnesium acetate, and zinc acetate.

Although the concentration of the polyvalent metal compound in the solution (MI) is not particularly limited, it is preferably in the range from $5 \times 10^{-4}$ wt % to 50 wt %, more preferably in the range from $1 \times 10^{-2}$ wt % to 30 wt %, and further preferably in the range from 1 wt % to 20 wt %.

Although the temperature of the solution (MI) when the layered product (A) is brought into contact with the solution (MI) is not particularly limited, the ionization rate of the carboxyl group containing polymer is higher with the higher temperature. Preferred temperature is, for example, in the range from 30° C. to 140° C., preferably in the range from 40° C. to 120° C., more preferably in the range from 50° C. to 100° C.

After the layered product (A) is brought into contact with the solution (MI), the solvent remained on the layered product is desirably removed. The method for removing the solvent is not particularly limited, and a known method is applicable. Specifically, drying techniques such as hot-air drying, hot roll contact, infrared heating, and microwave heating are applicable individually or in combination with a plurality of them. The temperature for removing the solvent is not particularly limited as long as it is at least 15° C. to 20° C. lower than the flow start temperature of the base material and also is at least 15° C. to 20° C. lower than the thermal decomposition start temperature of the carboxylic acid containing polymer. The drying temperature is preferably in the range from 80° C. to 200° C., more preferably in the range from 100° C. to 180° C., and further preferably in the range from 110° C. to 180° C. The solvent may be removed under either a normal pressure or a reduced pressure.

In order not to impair the appearance of the surface of the gas barrier layered product, the excessive polyvalent metal compounds adhered to the surface of the layered product are preferably removed before or after removing the solvent. A preferred method for removing the polyvalent metal compound is washing with a solvent in which the polyvalent metal compound dissolves. A solvent that can be used for the solution (MI) is applicable the solvent in which the polyvalent metal compound dissolves, and the same solvent as that of the solution (MI) is preferred.

The manufacturing method of the present invention may include heat-treating the layered product (A) or (B). Although the heat treatment can be carried out at any stage after almost completing the removal of the solvent in the mixed solution (S), the layered product before the ionization process (i.e. the layered product (A)) may be heat-treated for obtaining a gas barrier layered product with an excellent surface appearance. The temperature for the heat treatment is preferably in the range from 50° C. to 250° C., more preferably in the range from 60° C. to 230° C., and further preferably in the range from 80° C. to 210° C. The heat treatment can be carried out in an atmosphere such as an air, a nitrogen atmosphere, and an argon atmosphere.

In the method of the present invention, the compound (D) is added to the nixed solution (S). Adding the compound (D) enables to lower the temperature and shorten the time required for the heat treatment. For example, a composition required to be heat-treated at a temperature of at least 200° C. to obtain a layered product with excellent appearance may be heat-treated at a temperature not more than 180° C. to successfully obtain a layered product with the equivalent quality by adding the compound (D).

In the manufacturing method of the present invention, ultraviolet rays may be applied to the layered product (A) or (B). The ultraviolet rays may be applied anytime after the solvent in the mixed solution (S) is almost removed. The method is not particularly limited, and a known method is applicable. The wavelengths of the ultraviolet rays to be applied are preferably in the range from 170 nm to 250 nm, more preferably in the range from 170 nm to 190 nm and/or in the range from 230 nm to 250 nm. In addition, instead of the ultraviolet application, radial rays such as electron rays and gamma rays may be applied.

One may employ either one or both of the heat treatment and the ultraviolet application. The heat treatment and/or the ultraviolet application may help the layered product to exhibit a further improved gas barrier property.

The gas barrier layered product of the present invention has an excellent barrier property against gases such as oxygen, water vapor, carbon dioxide, and nitrogen, and it can maintain the excellent barrier property at a high standard even under a highly humid condition or after subjected to a bending condition. Moreover, it exhibits an excellent gas barrier property even after retort pouch processing. Accordingly, the gas barrier layered product of the present invention has a good gas barrier property not dependent on the environmental conditions such as humidity and exhibits an excellent gas barrier property even after bending conditions, and thus it is applicable to various purposes. For example, the gas barrier layered product of the present invention is particularly useful as a food packaging material (particularly a packaging material for retort packed foods). The gas barrier layered product of the present invention also can be used as a material for packaging articles such as chemicals like agricultural chemicals and medicines, industrial materials like materials for precision instruments, and garments.

EXAMPLES

Hereinafter, the present invention is described more in detail with Examples. It should be noted, though, that the present invention is not limited to the following examples.

The measurements and evaluations in the following examples were carried out by the following methods from (1) to (8). Some of the abbreviations used in the following description for measurement methods and evaluation methods may be described later. Results of the measurement and the evaluation are shown in the tables following the descriptions of the examples and the comparative examples.

(1) Oxygen Barrier Property

A layered product having a structure of a gas barrier layer/AC/OPET was prepared for measuring the oxygen transmission rate using an oxygen transmission rate test system ("MOCON OX-TRAN 10/50", manufactured by Modern Controls, Inc.). Specifically, the layered product was placed to have the gas barrier layer facing the oxygen supply side and OPET facing the career gas side, and thus the oxygen transmission rate (unit: $CC/m^2 \cdot day \cdot atm$) was measured under conditions of a temperature of 20° C., an oxygen pressure of 1 atm, and a career gas pressure of 1 atm. The humidity was conditioned at 85% RH, and the same humidity was applied for both the oxygen supply side and the career gas side.

(2) Oxygen Barrier Property after Retort Pouch Processing

Two layered products (a size of 12 cm×12 cm) were fabricated that have a structure of a gas barrier layer/AC/OPET/an adhesive/ONy/an adhesive/PP. The two layered products were stacked together to have the gas barrier layers facing the outside, and then three sides of the layered products were heat-sealed by 5 mm from the respective edges. Eighty grams of distilled water was poured between the two layered products thus heat-sealed, and then the remained fourth side was heat-sealed in the same manner. In this way, a pouch containing the distilled water inside was fabricated.

Then, the pouch was immersed in an autoclave filled with water from the tap and was subjected to retort pouch processing under conditions of a temperature at 120° C. and for 30 minutes. After the retort pouch processing, the pouch was stopped heating and taken out of the autoclave when the inner temperature decreased to 60° C., and then it was left for one hour in a room at a temperature of 20° C. and a humidity of 85% RH. After that, the heat-sealed parts were cut off with scissors and the water adhered to the surfaces of the gas barrier layered products was wiped off by lightly pressing a paper towel against the surfaces. After that, the pouch was left for a week in a room at a temperature of 20° C. and a humidity of 85% RH, and then the oxygen transmission rate of the layered product thus obtained was measured to evaluate the oxygen barrier property after retort pouch processing.

The oxygen transmission rate was measured using the oxygen transmission rate test system ("MOCON OX-TRAN 10/50", manufactured by Modern Controls, Inc.). Specifically, the layered product was placed to have the gas barrier layer facing the oxygen supply side and the PP facing the career gas side, and then the oxygen transmission rate (unit: $cc/m^2 \cdot days \cdot atm$) was measured under conditions of a temperature of 20° C., a relative humidity on the oxygen supply side at 85% and on the carrier gas side at 100%, an oxygen pressure of 1 atm, and a career gas pressure of 1 atm. The concentration of the calcium metal in the water from the tap used for the retort pouch processing was 15 ppm.

(3) Transparency (Haze)

The layered product fabricated for evaluating the (1) Oxygen Barrier Property was subjected to haze value measurement according to the method of JIS K 7105 using a haze meter (HR-100; Murakami Color Research Laboratory, Inc.).

The haze value [(diffused light transmittance/total light transmittance)×100] is used as a typical index for evaluating the transparency of a material. Generally, a material having a lower haze value is considered to have higher transparency. How small the haze value should be for sufficient transparency cannot be determined simply, because the standards for judgement vary depending on purposes. The haze value of 3% or lower, however, is suitably applicable to purposes requiring considerably high transparency.

(4) Neutralization Degree (Ionization Degree) of Carboxyl Group by Metal Ions

The layered product fabricated for evaluating the (1) Oxygen Barrier Property was subjected to observation of the peak of the stretching vibration of C=O contained in the gas barrier layer in the mode of ATR (attenuated total reflection) using a Fourier Transform Infrared Spectrophotometer (manufactured by Shimadzu Corporation; 8200PC). The peak attributed to the stretching vibration of C=O of the carboxyl group contained in the carboxylic acid containing polymer before ionization was observed in the range from $1600\ cm^{-1}$ to $1850\ cm^{-1}$, and that to the stretching vibration of C=O of the carboxyl group after ionization was observed in the range from $1500\ cm^{-1}$ to $1600\ cm^{-1}$. The ratio was then calculated from the maximum absorbances in the respective ranges to determine the ionization degree using the ratio and the calibration curve which was prepared beforehand by the following method.

[Preparation of Calibration Curve]

Polyacrylic acid with a number average molecular weight of 150,000 was dissolved in distilled water, and carboxyl groups were neutralized with a predetermined amount of sodium hydroxide. A base material was coated with an aqueous solution of the neutralized product of the polyacrylic acid thus obtained to have the same thickness as that of the gas barrier layer of the layered product to be subjected to the measurement of ionization degree, and then was dried. The base material employed a drawn PET film (manufactured by Toray Industries, Inc.; Lumirror (Trade Name); Thickness: 12 μm; hereinafter also may be abbreviated as "OPET") having the surface coated with a two-component anchor coating agent (manufactured by Mitsui Takeda Chemicals, Inc.; Takelac 3210 (Trade Name) and Takenate A3072 (Trade Name); hereinafter also may be abbreviated as "AC"). In this way, 11 standard samples of layered products (each having a structure of a layer formed of a neutralized product of polyacrylic acid/AC/OPET) were fabricated to be varied in neutralization degree of the carboxyl groups between 0 mol % and 100 mol % by increments of 10 mol %. These samples were subjected to the measurement of the infrared absorption spectrum in the mode of ATR (attenuated total reflection) using a Fourier Transform Infrared Spectrophotometer (manufactured by Shimadzu Corporation; 8200PC). The ratio between the maximum absorbances was then calculated for the two peaks corresponding to the stretching vibration of C=O contained in the layer formed of the neutralized product of polyacrylic acid, i.e. the peak observed in the range of 1600 cm$^{-1}$ to 1850 cm$^{-1}$ and the peak observed in the range of 1500 cm$^{-1}$ to 1600 cm$^{-1}$. The calibration curve was then prepared using the calculated ratios and the ionization degrees of the respective standard samples.

(5) Content of Inorganic Component

The content of the inorganic components of the gas barrier layer obtained before the ionization treatment was calculated by the method described above, i.e., the method of calculating from the weight of the raw materials.

(6) Measurement of Slip Angle (Evaluation of Slip Property)

A layered product having a structure of a gas barrier layer/AC/OPET was humidity conditioned by being left in a room conditioned at a temperature of 23° C. and a relative humidity of 50% RH for at least one week. This layered product was cut into one layered product having a size covering a slip plate (manufactured by SUS, a size of 23.6×10.5×0.2 cm) and five layered products covering a thread (manufactured by SUS, a size of 4×3×1 cm, a weight of 91.9281 g).

Next, both the slip plate and the thread were attached to the layered products so that both of them are covered, and they were fixed by cellophane tape. Then, the slip plate was fixed to the stage of a slip angle measuring device. This device can vary the slope of the stage at a rate of 2.9 degrees per second. Then, the thread was placed on the slip plate to make the layered products contact with each other. The stage was controlled to make the slip plate parallel to the ground, and the slip angle at this position was defined as 0 degree. The stage was then sloped at a rate of 2.9 degrees per second and the degree that the thread started sliding was read out. The stage was then returned to the 0 degree, and the layered product installed to the thread was replaced for another to carry out measurement for the remained four layered products. An average value of the five measurements was calculated to define the slip angle of the layered product. A layered product with a better slip property has a smaller slip angle.

(7) Measurement of Peel Strength (7-1) Peel Strength Before Retort Pouch Processing A layered product having a structure of OPET/AC/a gas barrier layer/an adhesive layer (1)/ONy/an adhesive layer (2)/PP was fabricated, and then the layered product was cut to a width of 15 mm. T-type peel strength was measured at a tensile rate of 250 mm/min, with the separation plane defined the interface between the barrier layer and the adhesive layer (1).

(7-2) Peel Strength after Retort Pouch Processing

A layered product having a structure of OPET/AC/a gas barrier layer/an adhesive layer (1)/ONy/an adhesive layer (2)/PP was fabricated, and then the layered product was cut to 25 mm×150 mm. As a separate procedure, two polypropylene layers (40 mm×200 mm) were stacked together and then three sides of the stacked polypropylene were heat-sealed by 5 mm from the respective edge to fabricate a pouch. The layered product described above was put into the pouch, and distilled water was poured to immerse the layered product completely, followed by heat-sealing the fourth side in the same manner while venting the air in the pouch. In this way, the pouch was fabricated that contained the layered product immersed in distilled water.

The pouch was then immersed in an autoclave filled with water from the tap and was subjected to retort pouch processing under conditions of a temperature at 120° C. and for 30 minutes. After the retort pouch processing, the pouch was stopped heating and taken out of the autoclave when the inner temperature decreased to 60° C., and then it was left for one hour in a room at a temperature of 23° C. and a humidity of 50% RH. After that, the heat-sealed parts were cut off with scissors and the gas barrier layered product was taken out, and then the water adhered to the surfaces of the gas barrier layered products was wiped off by lightly pressing a paper towel. After that, the layered product was cut to a width of 15 mm. T-type peel strength was measured at a tensile rate of 250 mm/min, with the separation plane defined the interface between the barrier layer and the adhesive layer (1).

(8) Surface Appearance after Ionization

The layered product fabricated for evaluating the (1) Oxygen Barrier Property was subjected to visual observation of transparency and surface condition (if roughness or cracks were formed). The case without forming roughness or cracks was determined as "good (A)", and the case with forming them was determined as "poor (B)".

Example 1

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 12.3 parts by weight of a 10 wt % isopropanol solution of titanium tetraisopropoxide and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S1).

Separately, a two-component anchor coating agent (manufactured by Mitsui Takeda Chemicals: Takelac A-626 (Trade Name) and Takenate A-50 (Trade Name)) were coated on a drawn PET film (OPET) and then dried to fabricate a base material (AC/OPET) having an anchor coat layer. The mixed solution (S1) was coated on the anchor coat layer of the base material using a bar coater to have a thickness of 2 μm after dried, and then was dried at a temperature of 80° C. for two minutes, followed by heat-treatment in dry air at a temperature of 180° C. for five minutes. In this way, a layered product (1) was obtained that had a structure of a gas barrier layer (2 μm)/AC/OPET (12 m). The gas barrier layer was colorless and transparent and had a very good appearance.

Then, calcium acetate was dissolved in distilled water to have a concentration of 2 wt % for preparing an aqueous solution of calcium acetate, and the aqueous solution (MI-1) was kept warm at a temperature of 80° C. Then, the layered product (1) was immersed in this aqueous solution (80° C.) for approximately five seconds. After the immersion, the layered product was taken out, and the surfaces of the layered product were washed with distilled water, followed by being dried at a temperature of 80° C. for five minutes. In this way, a layered product (B-1) of the present invention was obtained that had a structure of a gas barrier layer/AC/OPET. The layered product (B-1) was subjected to the measurement of the neutralization degree of the carboxyl groups of the polyacrylic acid in the gas barrier layer by the methods above. As a result, 75 mol % of the carboxyl groups had been neutralized by calcium ions. The layered product (B-1) thus obtained was subjected to evaluation of appearance after ionization, the oxygen transmission rate, the haze, the slip angle, and the content of inorganic components by the methods described above.

Further, a two-component adhesive (manufactured by Mitsui Takeda Chemicals, Inc., A-385 (Trade Name) and A-50 (Trade Name)) was coated on an drawn nylon film (manufactured by Unitika Ltd., Emblem (Trade Name), with a thickness of 15 μm, hereinafter also may be abbreviated as "ONy") and a polypropylene film (manufactured by Tohcello Co., Ltd., RXC-18 (Trade Name), with a thickness of 50 μm, hereinafter also may be abbreviate as "PP"), and then they were dried to be laminated with the layered product (B-1). In this way, a layered product (B-1-1) was obtained that had a structure of a gas barrier layer/AC/OPET/an adhesive/ONy/an adhesive/PP. A layered product was fabricated similarly that had a structure of OPET/AC/a gas barrier layer/an adhesive/ONy/an adhesive/PP. The layered product was used for evaluating the peel strength before and after retort pouch processing, and the oxygen transmission rate after retort pouch processing by the methods described above.

Example 2

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 9.90 parts by weight of a 10 wt % isopropanol solution of titanium lactate and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S2).

Then, in the same method as Example 1 except for using the mixed solution (S2) instead of the mixed solution (S1), a layered product (2) was fabricated that had a structure of a gas barrier layer (2 μm)/AC/OPET (12 μm). The gas barrier layer in the layered product (2) was colorless and transparent and had a very good appearance.

Then, the layered product (2) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-2) of the present invention. The layered product (B-2) was subjected to the measurement of the neutralization degree of the carboxyl groups of the polyacrylic acid in the gas barrier layer by the methods above. As a result, 80 mol % of the carboxyl groups had been neutralized by calcium ions. The layered product (B-2) was evaluated in the appearance after ionization, the oxygen transmission rate, the haze, the slip angle, and the content of inorganic components by the methods described above.

Further, the layered product (B-2) was used to fabricate a layered product (B-2-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 3

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 15.8 parts by weight of a 10 wt % isopropanol solution of titanium acetylacetonate and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S3).

Then, in the same method as Example 1 except for using the mixed solution (S3) instead of the mixed solution (S1), a layered product (3) was fabricated that had a structure of a gas barrier layer (2 μm)/AC/OPET (12 μm). The gas barrier layer in the layered product (3) was colorless and transparent and had a very good appearance.

Then, the layered product (3) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-3) of the present invention. The layered product (B-3) was subjected to the measurement of the neutralization degree of the carboxyl groups of the polyacrylic acid in the gas barrier layer by the methods above. As a result, 77 mol % of the carboxyl groups had been neutralized by calcium ions. The layered product (B-3) was evaluated in the appearance after ionization, the oxygen transmission rate, the haze, the slip angle, and the content of inorganic components by the methods described above.

Further, the layered product (B-3) was used to fabricate a layered product (B-3-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 4

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 14.0 parts by weight of a 10 wt % aqueous solution of zirconium oxychloride 8-hydrate and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S4).

Then, in the same method as Example 1 except for using the mixed solution (S4) instead of the mixed solution (S1), a layered product (4) was fabricated that had a structure of a gas barrier layer (2 μm)/AC/OPET (12 μm). The gas barrier layer in the layered product (4) was colorless and transparent and had a very good appearance.

Then, the layered product (4) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-4) of the present invention. The layered product (B-4) was subjected to the measurement of the neutralization degree of the carboxyl groups of the polyacrylic acid in the gas barrier layer by the methods above. As a result, 75 mol % of the carboxyl groups had been neutralized by calcium ions. The layered product (B-4) was evaluated in the appearance after ionization, the oxygen transmission rate, the haze, the slip angle, and the content of inorganic components by the methods described above.

Further, the layered product (B-4) was used to fabricate a layered product (B-4-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 5

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 7.41 parts by weight of a 10 wt % isopropanol solution of titanium tetraisopropoxide and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S5).

Then, in the same method as Example 1 except for using the mixed solution (S5) instead of the mixed solution (S1), a layered product (5) was fabricated that had a structure of a gas barrier layer (2 μm)/AC/OPET (12 μm). The gas barrier layer in the layered product (5) was colorless and transparent and had a very good appearance.

Then, the layered product (5) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-5) of the present invention. The layered product (B-5) was subjected to the measurement of the neutralization degree of the carboxyl groups of the polyacrylic acid in the gas barrier layer by the methods above. As a result, 78 mol % of the carboxyl groups had been neutralized by calcium ions. The layered product (B-5) was evaluated in the appearance after ionization, the oxygen transmission rate, the haze, the slip angle, and the content of inorganic components by the methods described above.

Further, the layered product (B-5) was used to fabricate a layered product (B-5-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 6

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 2.47 parts by weight of a 10 wt % isopropanol solution of titanium tetraisopropoxide and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S6).

Then, in the same method as Example 1 except for using the mixed solution (S6) instead of the mixed solution (S1), a layered product (6) was fabricated that had a structure of a gas barrier layer (2 μm)/AC/OPET (12 μm). The gas barrier layer in the layered product (6) was colorless and transparent and had a very good appearance.

Then, the layered product (6) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-6) of the present invention. The layered product (B-6) was subjected to the measurement of the neutralization degree of the carboxyl groups of the polyacrylic acid in the gas barrier layer by the methods above. As a result, 81 mol % of the carboxyl groups had been neutralized by calcium ions. The layered product (B-6) was evaluated in the appearance after ionization, the oxygen transmission rate, the haze, the slip angle, and the content of inorganic components by the methods described above.

Further, the layered product (B-6) was used to fabricate a layered product (B-6-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 7

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 37.0 parts by weight of a 10 wt % isopropanol solution of titanium tetraisopropoxide and then stirred at a temperature of 10° C. for five minutes. Then, the sol was diluted with 173 parts by weight of distilled water, and then was added promptly with 625 parts by weight of the 10 wt % polyacrylic acid aqueous solution being stirred to obtain a mixed solution (S7).

Then, in the same method as Example 1 except for using the mixed solution (S7) instead of the mixed solution (S1), a layered product (7) was fabricated that had a structure of a gas barrier layer (2 μm)/AC/OPET (12 μm). The gas barrier layer in the layered product (7) was colorless and transparent and had a very good appearance.

Then, the layered product (7) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-7) of the present invention. The layered product (B-7) was subjected to the measurement of the neutralization degree of the carboxyl groups of the polyacrylic acid in the gas barrier layer by the methods above. As a result, 70 mol % of the carboxyl groups had been neutralized by calcium ions. The layered product (B-7) was evaluated in the appearance after ionization, the oxygen transmission rate, the haze, the slip angle, and the content of inorganic components by the methods described above.

Further, the layered product (B-7) was used to fabricate a layered product (B-7-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 8

Polyacrylic acid (PAA) with a number average molecular weight of 150,000 was dissolved in distilled water, and thus a polyacrylic acid aqueous solution was obtained which has the solid content concentration of 10 wt %.

Next, 87.7 parts by weight of tetramethoxysilane (TMOS) was dissolved in 89.0 parts by weight of methanol, and then 1.32 parts by weight of 3-mercaptopropyltrimethoxysilane (manufactured by Chisso Corporation) was dissolved therein, followed by preparing a sol by adding 5.90 parts by weight of distilled water and 14.6 parts by weight of 0.1N hydrochloric acid. The sol was subjected to hydrolysis and condensation reactions at 10° C. for one hour while being stirred. The sol thus obtained was added with 12.7 parts by weight of a 10 wt % isopropanol solution of titanium tetraisopropoxide and then stirred at a temperature of 10° C. for five minutes. Then, the sol was diluted with 156 parts by weight of distilled water, and then was added promptly with 645 parts by weight of the 10 wt % polyacrylic acid aqueous solution being stirred to obtain a mixed solution (S8).

Then, in the same method as Example 1 except for using the mixed solution (S8) instead of the mixed solution (S1), a layered product (8) was fabricated that had a structure of a gas barrier layer (2 μm)/AC/OPET (12 μm). The gas barrier layer in the layered product (8) was colorless and transparent and had a very good appearance.

Then, the layered product (8) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-8) of the present invention. The layered product (B-8) was subjected to the measurement of the neutralization degree of the carboxyl groups of the polyacrylic acid in the gas barrier layer by the methods above. As a result, 85 mol % of the carboxyl groups had been neutralized by calcium ions. The layered product (B-8) was evaluated in the appearance after ionization, the oxygen transmission rate, the haze, the slip angle, and the content of inorganic components by the methods described above.

Further, the layered product (B-8) was used to fabricate a layered product (B-8-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 9

Polyacrylic acid (PAA) with a number average molecular weight of 150,000 was dissolved in distilled water, and thus a polyacrylic acid aqueous solution was obtained which has the solid content concentration of 10 wt %.

Next, 70.9 parts by weight of tetramethoxysilane (TMOS) was dissolved in 97.3 parts by weight of methanol, and then 26.4 parts by weight of 3-mercaptopropyltrimethoxysilane (manufactured by Chisso Corporation) was dissolved therein, followed by preparing a sol by adding 6.07 parts by weight of distilled water and 15.0 parts by weight of 0.1N hydrochloric acid. The sol was subjected to hydrolysis and condensation reactions at 10° C. for one hour while being stirred. The sol thus obtained was added with 10.9 parts by weight of a 10 wt % isopropanol solution of titanium tetraisopropoxide and then stirred at a temperature of 10° C. for five minutes. Then, the sol was diluted with 234 parts by weight of distilled water, and then was added promptly with 550 parts by weight of the 10 wt % polyacrylic acid aqueous solution being stirred to obtain a mixed solution (S9).

Then, in the same method as Example 1 except for using the mixed solution (S9) instead of the mixed solution (S1), a layered product (9) was fabricated that had a structure of a gas barrier layer (2 µm)/AC/OPET (12 µm). The gas barrier layer in the layered product (9) was colorless and transparent and had a very good appearance.

Then, the layered product (9) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-9) of the present invention. The layered product (B-9) was subjected to the measurement of the neutralization degree of the carboxyl groups of the polyacrylic acid in the gas barrier layer by the methods above. As a result, 65 mol % of the carboxyl groups had been neutralized by calcium ions. The layered product (B-9) was evaluated in the appearance after ionization, the oxygen transmission rate, the haze, the slip angle, and the content of inorganic components by the methods described above.

Further, the layered product (B-9) was used to fabricate a layered product (B-9-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Example 10

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.9 parts by weight of methanol, and then 6.68 parts by weight of 3-chloropropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was added with 12.6 parts by weight of a 10 wt % isopropanol solution of titanium tetraisopropoxide and then stirred at a temperature of 10° C. for five minutes Then, the sol was diluted with 162 parts by weight of distilled water, and then was added promptly with 636 parts by weight of the 10 wt % polyacrylic acid aqueous solution being stirred to obtain a mixed solution (S10).

Then, in the same method as Example 1 except for using the mixed solution (S10) instead of the mixed solution (S1), a layered product (10) was fabricated that had a structure of a gas barrier layer (2 µm)/AC/OPET (12 µm). The gas barrier layer in the layered product (10) was colorless and transparent and had a very good appearance.

Then, the layered product (10) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (B-10) of the present invention. The layered product (B-10) was subjected to the measurement of the neutralization degree of the carboxyl groups of the polyacrylic acid in the gas barrier layer by the methods above. As a result, 83 mol % of the carboxyl groups had been neutralized by calcium ions. The layered product (B-10) was evaluated in the appearance after ionization, the oxygen transmission rate, the haze, the slip angle, and the content of inorganic components by the methods described above.

Further, the layered product (B-10) was used to fabricate a layered product (B-10-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Comparative Example 1

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.8 parts by weight of methanol, and then 6.60 parts by weight of 3-mercaptopropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was diluted with 173 parts by weight of distilled water, and then was added promptly with 625 parts by weight of the 10 wt % polyacrylic acid aqueous solution being stirred to obtain a mixed solution (SC1).

Then, in the same method as Example 1 except for using the mixed solution (SC1) instead of the mixed solution (S1), a layered product (C1) was fabricated that had a structure of a gas barrier layer (2 µm)/AC/OPET (12 µm). The gas barrier layer in the layered product (C1) was colorless and transparent and had a very good appearance.

Then, the layered product (C1) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (BC-1) of the comparative example. The layered product (BC-1) was subjected to the measurement of the neutralization degree of the carboxyl groups of the polyacrylic acid in the gas barrier layer by the methods above. As a result, 85 mol % of the carboxyl groups had been neutralized by calcium ions. The layered product (BC-1) was evaluated in the appearance after ionization, the oxygen transmission rate, the haze, the slip angle, and the content of inorganic components by the methods described above.

Further, the layered product (BC-1) was used to fabricate a layered product (BC-1-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Comparative Example 2

Polyacrylic acid (PAA) with a number average molecular weight of 150,000 was dissolved in distilled water, and thus a polyacrylic acid aqueous solution was obtained which has the solid content concentration of 10 wt %.

Next, 84.2 parts by weight of tetramethoxysilane (TMOS) was dissolved in 90.9 parts by weight of methanol, and then 6.68 parts by weight of 3-chloropropyltrimethoxysilane (manufactured by Chisso Corporation) was dissolved therein, followed by preparing a sol by adding 5.93 parts by weight of distilled water and 14.7 parts by weight of 0.1N hydrochloric acid. The sol was subjected to hydrolysis and condensation reactions at 10° C. for one hour while being stirred. The sol thus obtained was diluted with 162 parts by weight of distilled water, and then was added promptly with 636 parts by weight of the 10 wt % polyacrylic acid aqueous solution being stirred to obtain a mixed solution (SC2).

Then, in the same method as Example 1 except for using the mixed solution (SC2) instead of the mixed solution (S1), a layered product (C2) was fabricated that had a structure of a gas barrier layer (2 μm)/AC/OPET (12 μm). The gas barrier layer in the layered product (C2) was colorless and transparent and had a very good appearance.

Then, the layered product (C2) was subjected to ionization process using calcium acetate aqueous solution (MI-1) under the same conditions as Example 1. Subsequently, excessive calcium acetate was removed by washing with distilled water, and then it was dried at a temperature of 80° C. for five minutes to obtain a layered product (BC-2) of the present tier as the comparative example. The layered product (BC-2) was subjected to the measurement of the neutralization degree of the carboxyl groups of the polyacrylic acid in the gas barrier layer by the methods above. As a result, 88 mol % of the carboxyl groups had been neutralized by calcium ions. The layered product (BC-2) was evaluated in the appearance after ionization, the oxygen transmission rate, the haze, the slip angle, and the content of inorganic components by the methods described above.

Further, the layered product (BC-2) was used to fabricate a layered product (BC-2-1) that had a structure of a gas barrier layer/AC/OPET/an adhesive/ONy/an adhesive/PP by the same method as Example 1. A layered product was fabricated similarly that had a structure of OPET/AC/a gas barrier layer/an adhesive/ONy/an adhesive/PP. The layered product was evaluated in the peel strength before and after retort pouch processing, and the oxygen transmission rate after retort pouch processing by the methods described above.

Table 1 shows the composition of each sample.

TABLE 1

| Example | Carboxylic Acid Containing Polymer | Content of Inorganic Component [wt %] | Compound (B) Type | Compound (A) Type | Compound (A) Added Amount [mol %] *1 | Compound (D) Type | Compound (D) Added Amount [mol %] *2 | Polyvalent Metal Ion Type of Ion | Polyvalent Metal Ion Neutralization Degree [%] |
|---|---|---|---|---|---|---|---|---|---|
| Example 1 | PAA | 35 | TMOS | A-1 | 5 | C-1 | 0.5 | Ca | 75 |
| Example 2 | PAA | 35 | TMOS | A-1 | 5 | C-2 | 0.5 | Ca | 80 |
| Example 3 | PAA | 35 | TMOS | A-1 | 5 | C-3 | 0.5 | Ca | 77 |
| Example 4 | PAA | 35 | TMOS | A-1 | 5 | C-4 | 0.5 | Ca | 75 |
| Example 5 | PAA | 35 | TMOS | A-1 | 5 | C-1 | 0.3 | Ca | 78 |
| Example 6 | PAA | 35 | TMOS | A-1 | 5 | C-1 | 0.1 | Ca | 81 |
| Example 7 | PAA | 35 | TMOS | A-1 | 5 | C-1 | 1.5 | Ca | 70 |
| Example 8 | PAA | 35 | TMOS | A-1 | 1 | C-1 | 0.5 | Ca | 85 |
| Example 9 | PAA | 35 | TMOS | A-1 | 20 | C-1 | 0.5 | Ca | 65 |
| Example 10 | PAA | 35 | TMOS | A-2 | 5 | C-1 | 0.5 | Ca | 83 |
| Comparative Example 1 | PAA | 35 | TMOS | A-1 | 5 | — | — | Ca | 85 |
| Comparative Example 2 | PAA | 35 | TMOS | A-2 | 5 | — | — | Ca | 88 |

A-1: 3-mercaptopropyltrimethoxysilane
A-2: 3-chloropropyltrimethoxysilane
C-1: tetraisopropoxytitanium
C-2: titanium lactate
C-3: titanium acetylacetonate
C-4: zirconium oxychloride 8-hydrate
*1: proportion of the compound (A) to the sum of the compound (A) and the compound (B). That is: [Compound (A)/(Compound (A) + Compound (B))]
*2: proportion to the carboxyl group in the carboxylic acid containing polymer.

Table 2 shows results for evaluating each sample.

TABLE 2

| Example | Transparency (Haze) % | Appearance After Ionization | Slip Angle | Peel Strength g/15 mm | | Oxygen Transmission Rate cc/m² · day · atm | |
|---|---|---|---|---|---|---|---|
| | | | | Before Retort | After Retort | Before Retort | After Retort |
| Example 1 | 1.5 | A | 19.3 | 550 | 490 | 0.4 | 0.3 |
| Example 2 | 1.8 | A | 19.1 | 510 | 450 | 0.4 | 0.3 |
| Example 3 | 2.0 | A | 20.0 | 500 | 430 | 0.3 | 0.2 |
| Example 4 | 1.8 | A | 19.6 | 520 | 440 | 0.3 | 0.2 |
| Example 5 | 1.9 | A | 21.4 | 540 | 450 | 0.3 | 0.2 |
| Example 6 | 2.2 | A | 22.5 | 520 | 400 | 0.2 | 0.2 |
| Example 7 | 1.2 | A | 18.0 | 580 | 530 | 0.6 | 0.4 |
| Example 8 | 2.6 | A | 19.3 | 450 | 400 | 0.2 | 0.4 |
| Example 9 | 1.0 | A | 19.0 | 570 | 540 | 0.6 | 0.6 |
| Example 10 | 2.3 | A | 19.5 | 500 | 460 | 0.4 | 0.4 |
| Comparative Example 1 | 2.9 | B | 27.3 | 440 | 30 | 0.2 | 0.2 |
| Comparative Example 2 | 2.8 | B | 28.1 | 420 | 20 | 0.2 | 0.2 |

As shown in Table 2, the layered products of the present invention using the compound (D) had good appearance after ionization and high peel strength after retort pouch processing even though the layered products were processed at relatively low temperature (180° C.). The layered products of the present invention had smaller slip angles compared to those of the layered products of the comparative examples.

In the above, the embodiments of the present invention were described using examples. The present invention, however, is not limited to the embodiments described above and are applicable to other embodiments according to the technical idea of the present invention.

The invention may be embodied in other forms without departing from the spirit or essential characteristics thereof. The embodiments disclosed in this description are to be considered in all respects as illustrative and not limiting. The scope of the invention is indicated by the appended claims rather than by the foregoing description, and all changes that come with the meaning and range of equivalency of the claims are intended to be embraced therein.

INDUSTRIAL APPLICABILITY

The present invention is applicable to layered products that are required to have a gas barrier property and methods for manufacturing the same. Particularly, the gas barrier layered product of the present invention exhibits a high oxygen barrier property independent of humidity, and exhibits a high oxygen barrier property even after subjected to retort pouch processing. For this reason, the gas barrier layered product of the present invention is used effectively as packaging materials for foods, medicines, medical equipments, machine parts, and garments, for example, and it is used particularly effectively for food packaging that requires a gas barrier property under high humidity. Specifically, it can serve as a layered product for a lid or a top of a container having contents such as cooked rice, instant Ramen noodles, yoghurt, fruit jelly, custard pudding and soybean paste, a pouch with a spout having contents such as space food and military field rations, a standing pouch, a vacuum insulation panel, a vacuum packed bag, a paper container, a windowed paper containers, a laminated tube container, a medical infusion bag and electronic component packaging, and it prevents the contents from deterioration over a long period of time.

The invention claimed is:

1. A gas barrier layered product comprising a base material and a layer stacked on at least one surface of the base material, wherein the layer is formed of a composition comprising:
   a hydrolyzed and condensed product of at least one compound (L) comprising a metal atom to which at least one group selected from a halogen atom and an alkoxy group is bonded, and at least one compound (A) in which an organic group having at least one characteristic group, selected from a halogen atom, a mercapto group and a hydroxyl group, is further bonded to the metal atom;
   a neutralized product of a polymer comprising at least one functional group selected from a carboxyl group and a carboxylic anhydride group, wherein at least 40 mol % of a —COO— group contained in the at least one functional group has been neutralized with a metal ion having a valence of two or more; and
   a compound (D) bonded to both the —COO— group contained in the at least one functional group and a group on the surface of the hydrolyzed and condensed product of the compound (L).

2. The gas barrier layered product according to claim 1, wherein the metal atom is silicon atom.

3. The gas barrier layered product according to claim 1, wherein the compound (A) is expressed by the following chemical formula (I):

$$Si(OR^1)_m R^2_n X^1_k Z_{4-m-n-k} \quad (I),$$

wherein each of $R^1$ and $R^2$ denotes an alkyl group independently; $X^1$ denotes a halogen atom; Z denotes an organic group having at least one characteristic group selected from a halogen atom, mercapto group and hydroxyl group; m denotes an integer from 0 to 3; n denotes an integer from 0 to 2; k denotes an integer from 0 to 3; $1 \leq m+k \leq 3$; $1 \leq m+n+k \leq 3$.

4. The gas barrier layered product according to claim 1, wherein the compound (A) includes at least one compound selected from chloromethyltrialkoxysilane, chloromethyltrichlorosilane, 2-chloroethyltrialkoxysilane, 2-chloroethyltrichlorosilane, 3-chloropropyltrialkoxysilane, 3-chloropropyltrichlorosilane, mercaptomethyltrialkoxysilane, mercaptomethyltrichlorosilane, 2-mercaptoethyltrialkoxysilane, 2-mercaptoethyltrichlorosilane, 3-mercaptopropyltrialkoxysilane, 3-mercaptopropyltrichlorosilane, N-(3-trialkoxysilylpropyl)gluconamide, and N-(3-trialkoxysilylpropyl)-4-hydroxybutylamide.

5. The gas barrier layered product according to claim 1, wherein the gas barrier layered product has an oxygen transmission rate of 1.0 cc/m$^2$·day·atm or lower in an atmosphere at a temperature of 20° C. and 85% RH.

6. The gas barrier layered product according to claim 1, wherein the gas barrier layered product has a haze value of 3% or lower.

7. The gas barrier layered product according to claim 1, wherein the compound (L) further comprises at least one compound (B) expressed by the following chemical formula (II):

$$M(OR^3)_q R^4_{p-q-r} X^2_r \qquad (II),$$

wherein M denotes Si, Al, Ti, Zr, Cu, Ca, Sr, Ba, Zn, B, Ga, Y, Ge, Pb, P, Sb, V, Ta, W, La, or Nd; $R^3$ denotes an alkyl group; $R^4$ denotes an alkyl group, an aralkyl group, an aryl group, or an alkenyl group; $X^2$ denotes a halogen atom; p is equal to a valence of metal element M; q denotes an integer from 0 to p; r denotes an integer from 0 to p; and $1 \leq q+r \leq p$.

8. The gas barrier layered product according to claim 7, wherein a molar ratio of the compound (A) to the compound (B) contained in the compound (L) satisfies the compound (A)/the compound (B)=from 0.1/99.9 to 40/60.

9. The gas barrier layered product according to claim 7, wherein the content of an inorganic component derived from the compound (L) in the composition is in the range from 5 wt % to 50 wt %.

10. The gas barrier layered product according to claim 1, wherein at least 70 mol % of the —COO— group contained in the at least one functional group has been neutralized with the metal ion having a valence of two or more.

11. The gas barrier layered product according to claim 1, wherein a monovalent ion neutralizes from 0.1 mol % to 10 mol % of the —COO— group contained in the at least one functional group.

12. The gas barrier layered product according to claim 1, wherein the polymer is at least one selected from polyacrylic acid polymer and polymethacrylic acid polymer.

13. The gas barrier layered product according to claim 1, wherein the compound (D) is tetraalkoxytitanium.

14. A packaging medium, comprising a gas barrier layered product according to claim 1.

15. A method of manufacturing a gas barrier layered product, comprising:
 (i) preparing a mixed solution of a compound (D), a hydrolyzed and condensed product of at least one compound (L) comprising a metal atom to which at least one group selected from a halogen atom and an alkoxy group is bonded, and a polymer comprising at least one functional group selected from carboxyl group and a carboxylic anhydride group;
 (ii) forming a layer on a base material by applying the mixed solution on the base material and drying; and
 (iii) bringing the layer into contact with a solution comprising a metal ion having a valence of two or more,
 wherein at least 40 mol % of a —COO— group contained in the at least one functional group is neutralized with a metal ion having a valence of two or more,
 wherein the compound (L) comprises at least one compound (A) in which an organic group having at least one characteristic group, selected from a halogen atom, a mercapto group and a hydroxyl group, is further bonded to the metal atom, and
 wherein the compound (D) is bonded to both the —COO— group contained in the at least one functional group and a group on the surface of the hydrolyzed and condensed product of the compound (L).

16. The method of manufacturing a gas barrier layered product according to claim 15, wherein in said bringing (iii), at least 70 mol % of the —COO— group contained in the at least one functional group has been neutralized with the metal ion having a valence of two or more.

17. The method of manufacturing a gas barrier layered product according to claim 15, wherein the hydrolyzed and condensed product and the compound (D) are mixed and then the polymer is further mixed to obtain the mixed solution in the step (i).

18. The method of manufacturing a gas barrier layered product according to claim 15, wherein the compound (D) is tetraalkoxytitanium.

19. The method of manufacturing a gas barrier layered product according to claim 15, wherein the compound (D) is a titanium compound and/or a zirconium compound.

20. The gas barrier layered product according to claim 1, wherein the compound (D) is a titanium compound and/or a zirconium compound.

* * * * *